US007334335B2

(12) United States Patent
Shin et al.

(10) Patent No.: US 7,334,335 B2
(45) Date of Patent: Feb. 26, 2008

(54) METHOD OF MANUFACTURING A MONOLITHIC INK-JET PRINTHEAD

(75) Inventors: Su-ho Shin, Suwon-si (KR); Seog-soon Baek, Suwon-si (KR); Seung-joo Shin, Seoul (KR); Yong-soo Oh, Seongnam-si (KR); Jong-woo Shin, Seoul (KR); Chang-seung Lee, Seongnam-si (KR); Ki-deok Bae, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 11/647,396

(22) Filed: Dec. 29, 2006

(65) Prior Publication Data

US 2007/0109357 A1 May 17, 2007

Related U.S. Application Data

(62) Division of application No. 10/861,451, filed on Jun. 7, 2004, now Pat. No. 7,178,905.

(30) Foreign Application Priority Data

Jun. 5, 2003 (KR) .............................. 2003-36332

(51) Int. Cl.
*B21D 53/76* (2006.01)
*G01D 15/00* (2006.01)
*B41J 2/05* (2006.01)

(52) U.S. Cl. ......................... 29/890.1; 29/611; 29/830; 29/831; 29/832; 216/27; 347/65

(58) Field of Classification Search ............... 29/890.1, 29/611, 830, 831, 832; 216/27, 67, 49, 57; 347/65, 55, 56, 57; 430/320
See application file for complete search history.

(56) References Cited

U.S. PATENT DOCUMENTS 4,894,664 A 1/1990 Tsusng Pan (Continued)

FOREIGN PATENT DOCUMENTS

EP 0 841 167 5/1998
EP 1 215 048 6/2002

OTHER PUBLICATIONS

Patent Abstracts of Japan, vol. 0012, No. 34 (M-611), Jul. 30, 1987 & JP 62-044467 (Watanabe) (Feb. 26, 1987).

*Primary Examiner*—A. Dexter Tugbang
*Assistant Examiner*—Tai van Nguyen
(74) *Attorney, Agent, or Firm*—Lee & Morse, P.C.

(57) ABSTRACT

A monolithic ink-jet printhead, and a method of manufacturing the same, includes a substrate having an ink chamber, an ink channel, and a manifold, a nozzle plate formed on the substrate, a nozzle, a heater, and a conductor. The ink chamber includes sidewalls formed to a predetermined depth from the front surface of the substrate for defining side surfaces of the ink chamber and a bottom wall formed parallel to the front surface of the substrate at the predetermined depth from the front surface of the substrate for defining a bottom surface of the ink chamber. The nozzle plate includes a plurality of passivation layers, a heat dissipating layer being stacked on the passivation layers, and the nozzle for ejecting ink out of the printhead. The heater is positioned above the ink chamber and heats ink in the ink chamber and the conductor delivers a current to the heater.

20 Claims, 18 Drawing Sheets

U.S. PATENT DOCUMENTS

| | | | | |
|---|---|---|---|---|
| 4,922,265 | A * | 5/1990 | Pan | 347/47 |
| 4,967,208 | A | 10/1990 | Childers | |
| 5,322,594 | A * | 6/1994 | Bol | 216/27 |
| 5,502,471 | A | 3/1996 | Obermeier et al. | |
| 5,855,835 | A | 1/1999 | Gordon et al. | |
| 5,859,654 | A | 1/1999 | Radke et al. | |
| 6,019,457 | A | 2/2000 | Silverbrook | |
| 6,234,608 | B1 * | 5/2001 | Genovese et al. | 347/54 |
| 6,382,782 | B1 | 5/2002 | Anagnostopoulos | |
| 6,398,348 | B1 | 6/2002 | Haluzak et al. | |
| 6,412,918 | B1 * | 7/2002 | Chen et al. | 347/56 |
| 6,431,687 | B1 | 8/2002 | Wuu et al. | |
| 6,533,399 | B2 | 3/2003 | Lee et al. | |
| 2003/0081072 | A1 | 5/2003 | Trueba | |
| 2003/0090548 | A1 | 5/2003 | Min et al. | |

* cited by examiner

METHOD OF MANUFACTURING A MONOLITHIC INK-JET PRINTHEAD

CROSS REFERENCE TO RELATED APPLICATION

This is a divisional application based on application Ser. No. 10/861,451, filed Jun. 7, 2004 now U.S. Pat. No. 7,178,905, the entire contents of which is hereby incorporated by reference.

BACKGROUND OF THE INVENTION

1. Field of the Invention

The present invention relates to an ink-jet printhead. More particularly, the present invention relates to a thermally-driven, monolithic ink-jet printhead, in which a plurality of nozzles is densely disposed to implement high-resolution printing, and a method of manufacturing the same.

2. Description of the Related Art

In general, ink-jet printheads are devices for printing a predetermined image, color or black, by ejecting a small volume droplet of ink at a desired position on a recording sheet. Ink-jet printheads are generally categorized into two types depending on which ink ejection mechanism is used. A first type is a thermally-driven ink-jet printhead, in which a heat source is employed to form and expand a bubble in ink to cause an ink droplet to be ejected due to an expansive force of the formed bubble. A second type is a piezoelectrically-driven ink-jet printhead, in which an ink droplet is ejected by a pressure applied to the ink and a change in ink volume due to a deformation of a piezoelectric element.

An ink droplet ejection mechanism of a thermally-driven ink-jet printhead will now be explained in detail. When a pulse current is supplied to a heater formed of a resistive heating material, the heater generates heat and ink near the heater is instantaneously heated to boiling. The boiling of the ink causes bubbles to be generated, thereby expanding and exerting pressure on the ink filling an ink chamber. As a result, ink in a vicinity of a nozzle is ejected from the ink chamber in the form of a droplet.

A thermal ink-jet printhead is classified into a top-shooting type, a side-shooting type, and a back-shooting type, depending on a growth direction of a bubble and an ejection direction of a droplet. In a top-shooting type printhead, a bubble grows in the same direction in which an ink droplet is ejected. In a side-shooting type of printhead, a bubble grows in a direction perpendicular to a direction in which an ink droplet is ejected. In a back-shooting type of printhead, a bubble grows in a direction opposite to a direction in which an ink droplet is ejected.

An ink-jet printhead using the thermal driving method should satisfy the following requirements. First, manufacturing of the ink-jet printheads should be simple, costs should be low, and should facilitate mass production thereof. Second, in order to obtain a high-quality image, cross talk between adjacent nozzles should be suppressed while a distance between adjacent nozzles should be narrow; that is, in order to increase dots per inch (DPI), a plurality of nozzles should be densely positioned. Third, in order to perform a high-speed printing operation, a period in which the ink chamber is refilled with ink after being ejected from the ink chamber should be as short as possible and the cooling of heated ink and heater should be performed quickly to increase an operating frequency.

FIGS. 1 through 3 illustrate various structures of conventional thermal ink-jet printheads using the back-shooting method.

FIG. 1 illustrates a perspective view of a structure of a first conventional ink-jet printhead. Referring to FIG. 1, an ink-jet printhead 20 includes a substrate 11, a cover plate 3, and an ink reservoir 12. The substrate 11 has a plurality of nozzles 10 through which ink droplets are ejected and an ink chamber 16 filled with ink to be ejected. The cover plate 3 has a through hole 2 providing flow communication between the ink chamber 16 and the ink reservoir 12, which supplies ink to the ink chamber 16. In addition, a heater 22, having a ring shape, is disposed around the nozzle 10 of the substrate 11.

In the above structure, if a pulse current is supplied to the heater 22 and heat is generated by the heater 22, ink in the ink chamber 16 boils and bubbles are generated and continuously expand. Due to this expansion, pressure is applied to ink filling the ink chamber 16. As a result, ink is ejected in droplet form through each of the plurality of nozzles 10. Subsequently, ink flows into the ink chamber 16 from the ink reservoir 12 through the through hole 2 formed in the cover plate 3. Thus, the ink chamber 16 is refilled with ink.

In this first conventional ink-jet printhead 20, however, a depth of the ink chamber 16 is almost the same as a thickness of the substrate 11. Thus, unless a very thin substrate is used, the size of the ink chamber 16 increases. Accordingly, pressure generated by bubbles for ejecting ink is dispersed by the ink, resulting in degradation to an ejection performance. When a thin substrate is used to reduce the size of the ink chamber 16, it becomes more difficult to process the substrate 11. By way of example, a depth of the ink chamber 16 in a typical conventional ink-jet printhead is about 10-30 μm. In order to form an ink chamber having this depth, a silicon substrate having a thickness of 10-30 μm should be used. It is virtually impossible, however, to process a silicon substrate having such a thickness using existing semiconductor processes.

Further, in order to manufacture an ink-jet printhead 20 having the above structure, the substrate 11, the cover plate 3, and the ink reservoir 12 are bonded together. Thus, a process of manufacturing such an ink-jet printhead becomes complicated, and an ink passage which significantly affects an ejection property, cannot be very elaborate due to potential misalignment during the bonding process.

FIGS. 2A and 2B illustrate a structure of a second conventional monolithic ink-jet printhead. More specifically, FIGS. 2A and 2B illustrate a plan view and a vertical cross-sectional view taken along line A-A' of FIG. 2A, respectively. Referring to FIGS. 2A and 2B, a hemispherical ink chamber 32 is formed on a front surface of a silicon substrate 30. A manifold 36, which supplies ink to the ink chamber 32, is formed on a rear surface of the substrate 30. An ink channel 34, which provides flow communication between the ink chamber 32 and the manifold 36 is formed at a bottom of the ink chamber 32. A nozzle plate 40, in which a plurality of material layers 41, 42, and 43 are stacked, is formed integrally with the substrate 30. A nozzle 47 is formed at a position of the nozzle plate 40 corresponding to a center of the ink chamber 32. A heater 45, which is connected to a conductor 46, is disposed around the nozzle 47. A nozzle guide 44 that extends in a lengthwise direction of the ink chamber 32 is formed at edges of the nozzle 47. In operation, heat generated by the heater 45 is transferred to ink 48 in the ink chamber 32 through an insulating layer 41. As a result, the ink 48 boils, and bubbles 49 are generated in the ink 48. The bubbles 49 expand, and pressure is applied to the ink 48 within the ink chamber 32. As a result, ink 48 in a vicinity of the nozzle 47 is ejected in the form of an ink droplet 48' through the nozzle 47. Subsequently, due to a surface tension that acts on the surface of the ink 48 contacting air, ink 48 flows into the ink chamber 32 through the ink channel 34 from the manifold 36, thereby refilling the ink chamber 32 with ink 48.

In this second conventional monolithic ink-jet printhead having the above structure, the silicon substrate 30 and the nozzle plate 40 form a single body such that a process of manufacturing the ink-jet printhead is simplified and misalignment may be prevented.

In this configuration, however, in order to form the ink chamber 32, the substrate 30 is isotropically etched through the nozzle 47. As a result, the ink chamber 32 has a hemispherical shape. Thus, in order to form an ink chamber 32 having a predetermined volume, a constant radius of the ink chamber 32 should be maintained. As a result, there is a limitation in narrowing a distance between adjacent nozzles 47 and disposing the nozzles 47 more densely. More specifically, in order to narrow a distance between adjacent nozzles 47, a radius of the ink chamber 32 should be reduced. Such a reduction results in a decrease in a volume of the ink chamber 32, and such a decrease is not preferable.

Accordingly, there is a limitation in densely disposing a plurality of nozzles using the structure of the second conventional monolithic ink-jet printhead, with respect to meeting the requirement for the ink-jet printhead with high DPI to print an image with high-resolution.

FIG. 3 illustrates a structure of a third conventional ink-jet printhead. Referring to FIG. 3, the ink-jet printhead includes a nozzle plate 50 having a nozzle 51, an insulating layer 60 having an ink chamber 61 and an ink channel 62, and a silicon substrate 70 having a manifold 55 for supplying ink to the ink chamber 61. The nozzle plate 50, the insulating layer 60, and the silicon substrate 70 are sequentially stacked.

In this third conventional ink-jet printhead, since the ink chamber 61 is formed using the insulating layer 60 stacked on the substrate 70, the ink chamber 61 may have a variety of shapes, and a backflow of ink may be suppressed.

When manufacturing this third conventional ink-jet printhead, however, a method of depositing the thick insulating layer 60 on the silicon substrate 70, etching the insulating layer 60, and forming the ink chamber 61 is generally used. This method has the following problems. First, it is difficult to stack a thick insulating layer on a substrate using existing semiconductor processes. Second, it is difficult to etch a thick insulating layer. Thus, there is a limitation on the depth of the ink chamber. As shown in FIG. 3, the ink chamber 61 and the nozzle 51 have a combined height of only about 6 μm. With such a shallow ink chamber, however, it is virtually impossible for an ink-jet printhead to have a relatively large drop size.

SUMMARY OF THE INVENTION

The present invention is therefore directed to a thermally-driven monolithic ink-jet printhead having an ink chamber in which a distance between adjacent nozzles is narrowed to print a high-resolution image, and a method of manufacturing the same, which substantially overcome one or more of the problems due to the limitations and disadvantages of the related art.

It is therefore a feature of an embodiment of the present invention to provide a monolithic ink-jet printhead including a substrate, an ink chamber to be filled with ink to be ejected being formed on a front surface of the substrate, a manifold for supplying ink to the ink chamber being formed on a rear surface of the substrate, and an ink channel in flow communication between the ink chamber and the manifold; the ink chamber including sidewalls formed to a predetermined depth from the front surface of the substrate for defining side surfaces of the ink chamber, and a bottom wall formed parallel to the front surface of the substrate at the predetermined depth from the front surface of the substrate for defining a bottom surface of the ink chamber; a nozzle plate formed on the front surface of the substrate, the nozzle plate including a plurality of passivation layers formed of an insulating material, a heat dissipating layer formed of a material having good thermal conductivity, the heat dissipating layer being stacked on the plurality of passivation layers, and a nozzle for ejecting ink out of the monolithic ink-jet printhead in flow communication with the ink chamber; a heater, which is disposed between adjacent layers of the plurality of passivation layers of the nozzle plate, the heater being positioned above the ink chamber and heating ink in the ink chamber; and a conductor, which is disposed between adjacent layers of the plurality of passivation layers of the nozzle plate, the conductor being electrically connected to the heater and delivering a current to the heater.

The sidewalls and the bottom wall may be formed of a material other than a material of the substrate. The sidewalls and the bottom wall may be silicon oxide.

The ink chamber may be surrounded by sidewalls defining a substantially rectangular shape. The predetermined depth may be about 10-80 μm.

The substrate may be a silicon-on-insulator (SOI) substrate comprising a lower silicon substrate, an insulating layer, and an upper silicon substrate, which are sequentially stacked. The ink chamber and the sidewalls may be formed in the upper silicon substrate of the SOI substrate, and the insulating layer of the SOI substrate may form the bottom wall.

The heater may be disposed above the ink chamber and separated from the nozzle. For example, the nozzle may be disposed at a position corresponding to a center of the ink chamber, and the heater may be disposed on opposite sides of the nozzle. The nozzle may be offset from a lengthwise center of the ink chamber in a first direction and the heater may be offset from the lengthwise center of the ink chamber in a second direction, wherein the first direction and the second direction are opposite.

The ink channel may be vertically formed through the substrate and may be disposed at a location corresponding to where the ink chamber and the manifold are in flow communication. The printhead may further include a plurality of ink channels, wherein ink is supplied to the ink chamber from the manifold through the plurality of ink channels.

The plurality of passivation layers may include at least one passivation layer disposed between the substrate and the heater and at least one passivation layer disposed between the heater and the heat dissipating layer.

The plurality of passivation layers may include at least one passivation layer disposed between the substrate and the conductor and at least one passivation layer disposed between the conductor and the heat dissipating layer.

The passivation layers may be formed on upper portions of the heater and the conductor and at portions adjacent thereto.

A lower portion of the nozzle may be formed through the plurality of passivation layers, and an upper portion of the nozzle may be formed through the heat dissipating layer. The upper portion of the nozzle formed through the heat dissipating layer may have a tapered shape such that a diameter thereof decreases in a direction toward an outlet. The upper portion of the nozzle formed through the heat dissipating layer may have a pillar shape.

The heat dissipating layer may be formed of at least one metallic layer, and each of the at least one metallic layer is formed of at least one material selected from the group consisting of nickel (Ni), copper (Cu), aluminum (Al), and gold (Au). The heat dissipating layer may be formed to a thickness of about 10-100 μm. The heat dissipating layer may thermally contact the front surface of the substrate via a contact hole formed through the plurality of passivation layers.

The printhead may further include a seed layer for electroplating the heat dissipating layer formed on the passivation layers and at least a portion of the substrate. The seed layer may be formed of at least one metallic layer, and each of the at least one metallic layer is formed of at least one material selected from the group consisting of copper (Cu), chromium (Cr), titanium (Ti), gold (Au), and nickel (Ni).

It is another feature of an embodiment of the present invention to provide a method of manufacturing a monolithic ink-jet printhead, the method comprising forming a sacrificial layer surrounded by sidewalls and a bottom wall on a front surface of a substrate; sequentially stacking a plurality of passivation layers on the front surface of the substrate and forming a heater and a conductor connected to the heater between adjacent layers of the plurality of passivation layers; forming a heat dissipating layer on the plurality of passivation layers and forming a nozzle through which ink is ejected through the plurality of passivation layers and the heat dissipating layer to form a nozzle plate on the front surface of the substrate, the nozzle plate including the plurality of passivation layers and the heat dissipating layer; forming an ink chamber, which is defined by the sidewalls and the bottom wall, by etching the sacrificial layer exposed through the nozzle using the sidewalls and the bottom wall as an etch stop; forming a manifold for supplying ink by etching a rear surface of the substrate; and forming an ink channel by etching the substrate between the manifold and the ink chamber to provide flow communication between the manifold and the ink chamber.

Forming the sacrificial layer may include etching the front surface of the substrate to form a groove having a predetermined depth; oxidizing the front surface of the substrate in which the groove is formed to form the sidewalls and the bottom wall; filling the groove surrounded by the sidewalls and the bottom wall with a predetermined material to form the sacrificial layer; and planarizing the front surface of the substrate and the sacrificial layer. Filling the groove with the predetermined material may include epitaxially growing polysilicon in the groove.

Forming the sacrificial layer may include etching an upper silicon substrate of a silicon-on-insulator (SOI) substrate to a predetermined depth to form a trench; and filling the trench with a predetermined material to form the sidewalls. The predetermined material may be silicon oxide.

Forming the plurality of passivation layers may include forming a first passivation layer on the front surface of the substrate; forming the heater on the first passivation layer; forming a second passivation layer on the first passivation layer and the heater; forming the conductor on the second passivation layer; and forming a third passivation layer on the second passivation layer and the conductor. The third passivation layer may be formed on upper portions of the heater and the conductor and at portions adjacent thereto.

The heat dissipating layer may be formed of at least one metallic layer, and each of the at least one metallic layer is formed by electroplating at least one material selected from the group consisting of nickel (Ni), copper (Cu), aluminum (Al), and gold (Au). The heat dissipating layer may be formed to a thickness of about 10-100 μm.

Forming the heat dissipating layer and the nozzle may include forming a lower nozzle by etching the plurality of passivation layers formed on the sacrificial layer; forming a plating mold for forming an upper nozzle vertically from the inside of the lower nozzle; forming the heat dissipating layer on the plurality of passivation layers by electroplating; and removing the plating mold to form the nozzle having the upper nozzle and the lower nozzle.

The lower nozzle may be formed by dry etching the plurality of passivation layers by a reactive ion etching (RIE), and the plating mold may be formed of a photoresist or photosensitive polymer.

Forming the heat dissipating layer and the nozzle further may include forming a seed layer for electroplating the heat dissipating layer on the plurality of passivation layers. The seed layer may be formed of at least one metallic layer, and each of the at least one metallic layer is formed by depositing at least one metallic material selected from the group consisting of copper (Cu), chromium (Cr), titanium (Ti), gold (Au), and nickel (Ni).

The method may further include planarizing an upper surface of the heat dissipating layer by a chemical mechanical polishing (CMP) process, after forming the heat dissipating layer.

Forming the ink channel may include dry etching the substrate from a rear surface of the substrate having the manifold.

The ink chamber may have a substantially rectangular shape.

According to an embodiment of the present invention, because an ink chamber having an optimum planar shape and depth, which is defined by sidewalls and a bottom wall that serve as an etch stop, is formed, a distance between adjacent nozzles is narrowed and a monolithic ink-jet printhead with high DPI that is capable of printing a high-resolution image is implemented. In addition, since a nozzle plate is formed integrally with a substrate having an ink chamber and an ink channel, the monolithic ink-jet printhead can be implemented by a series of processes on a single wafer without any subsequent processes, thereby improving a yield of the monolithic ink-jet printhead and simplifying a manufacturing process of the monolithic ink-jet printhead.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Figure 1:
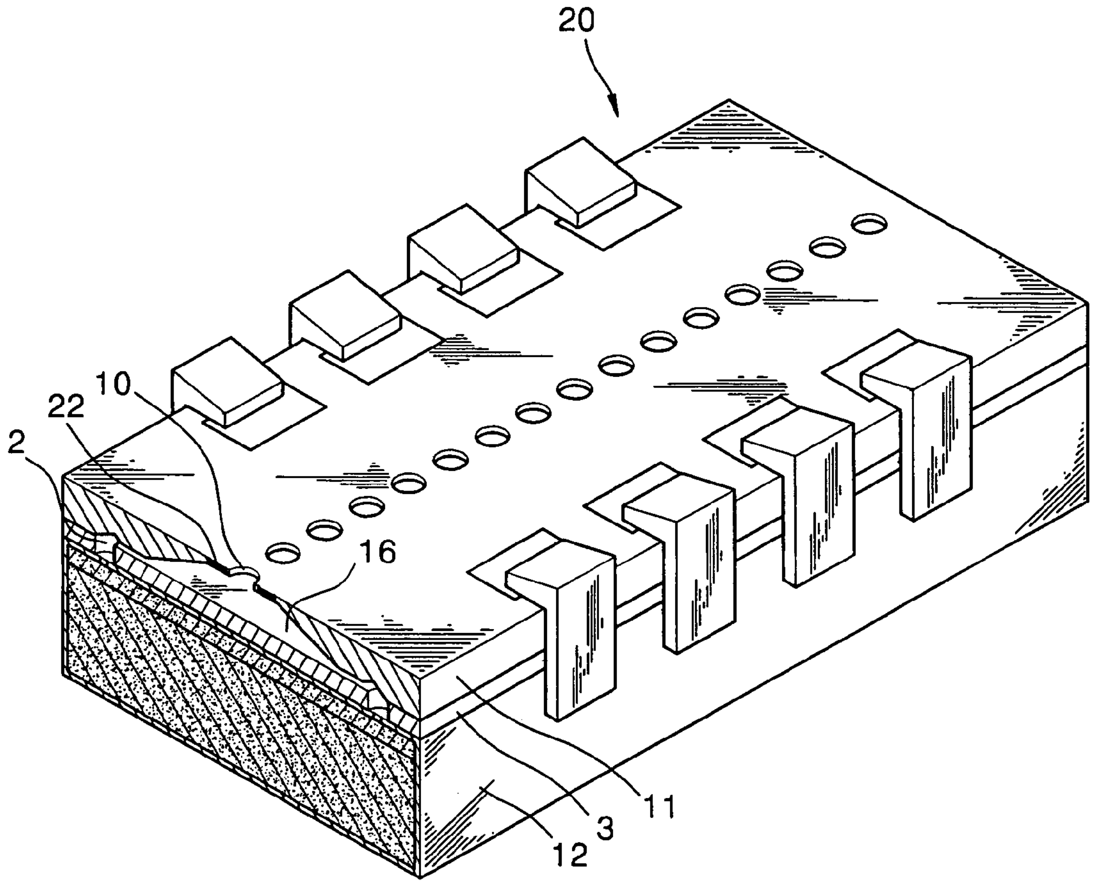
FIG. 1 (PRIOR ART)
FIG. 1 illustrates a perspective view of a first example of a conventional ink-jet printhead.
Figure 2A:
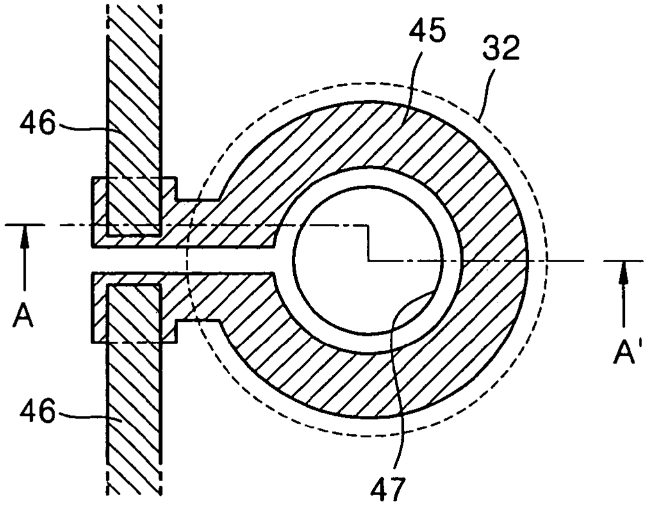
FIG. 2A (PRIOR ART)
FIGS. 2A and 2B illustrate a plan view and a vertical cross-sectional view taken along line A-A' of FIG. 2A, respectively, of a second example of a conventional ink-jet printhead.
Figure 2B:
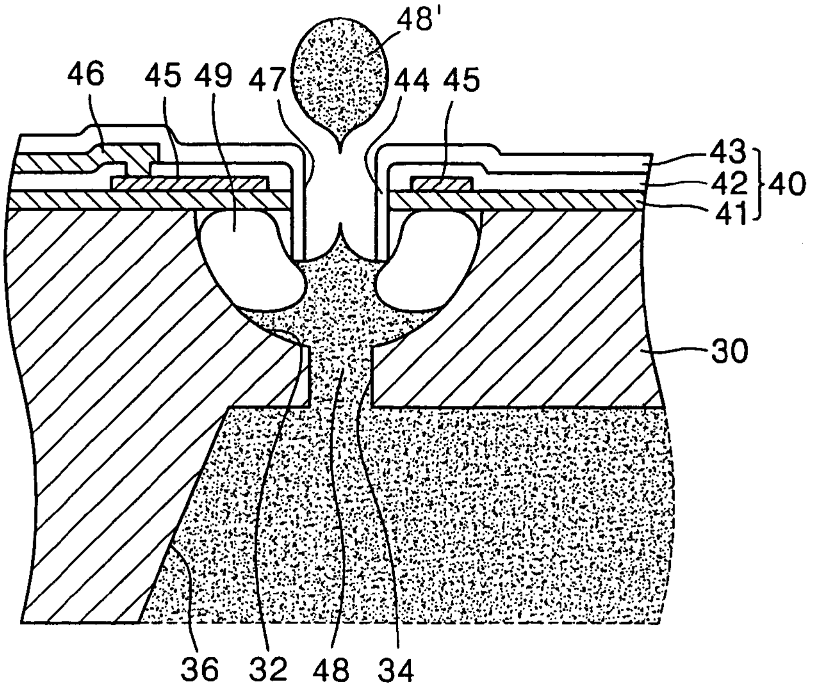
FIG. 2B (PRIOR ART)
Figure 3:
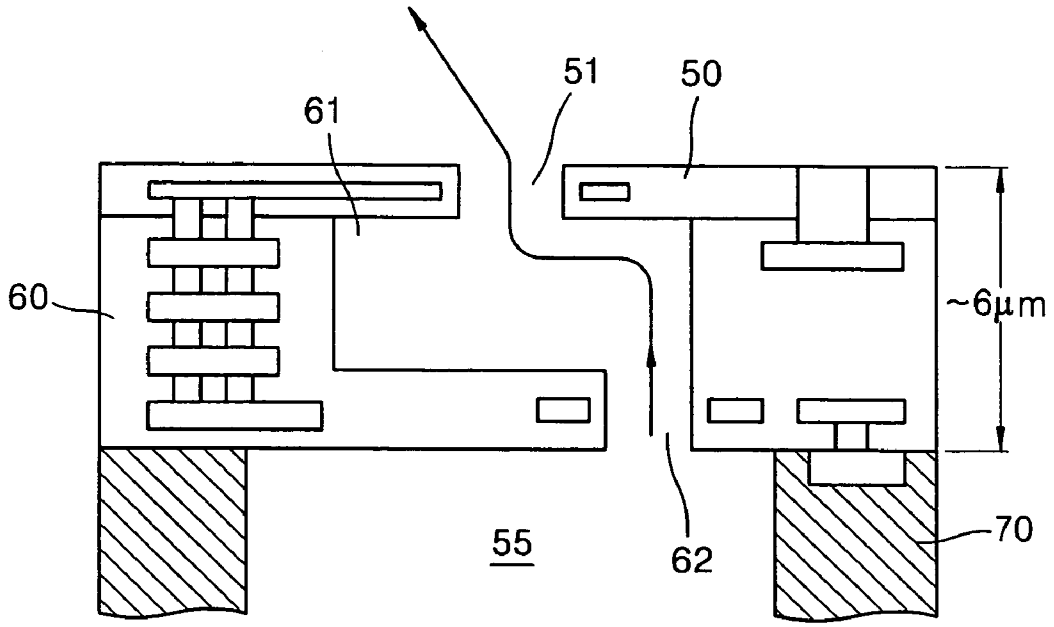
FIG. 3 (PRIOR ART)
FIG. 3 illustrates a vertical cross-sectional view of a third example of a conventional ink-jet printhead.

Korean Patent Application No. 2003-36332, filed on Jun. 5, 2003, in the Korean Intellectual Property Office, and entitled: "Monolithic Ink-Jet Printhead and Method of Manufacturing the Same," is incorporated by reference herein in its entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the figures, the dimensions of layers and regions are exaggerated for clarity of illustration. It will also be understood that when a layer is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 4:
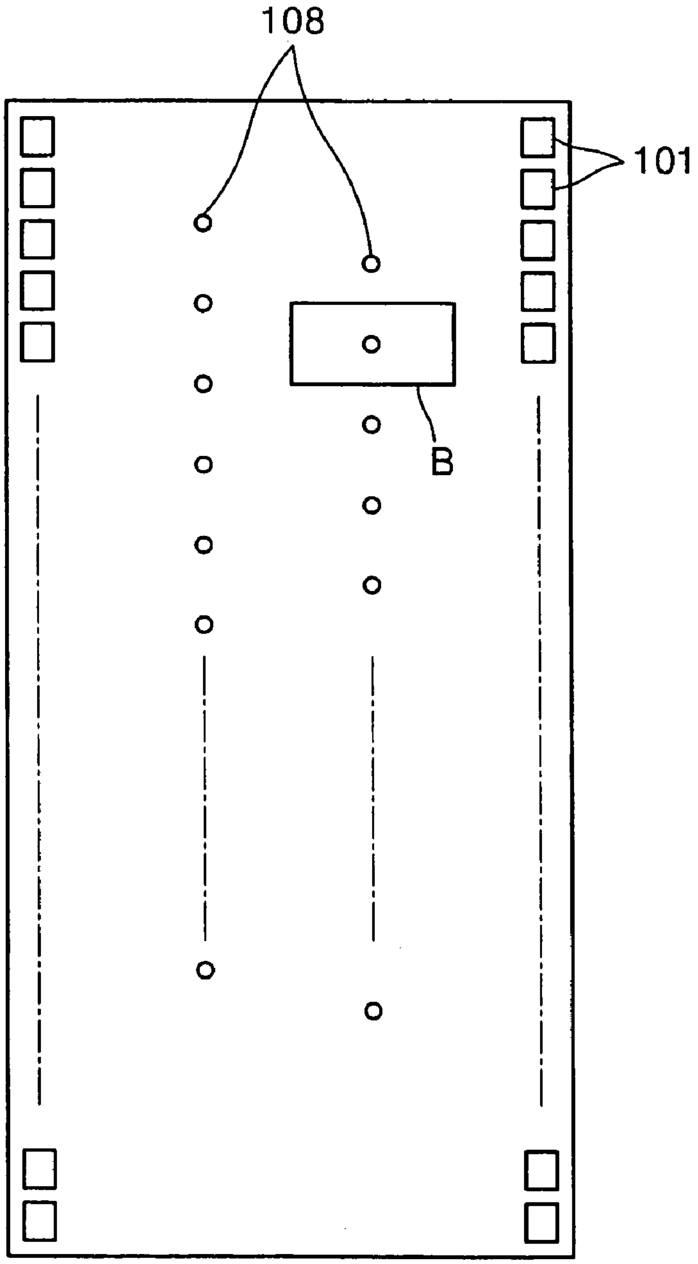
FIG. 4 schematically illustrates a plan view of an ink-jet printhead according to a first embodiment of the present invention.

FIG. 4 schematically illustrates a plan view of a monolithic ink-jet printhead according to a first embodiment of the present invention. Referring to FIG. 4, a plurality of nozzles 108 is exemplarily arranged in two rows on a surface of the ink-jet printhead manufactured in a chip state, and bonding pads 101, which can be bonded to wires, are disposed at edges of the surface of the ink-jet printhead. In alternative embodiments, the nozzles 108 may be arranged in one row, or in three or more rows to improve printing resolution.

Figure 5:
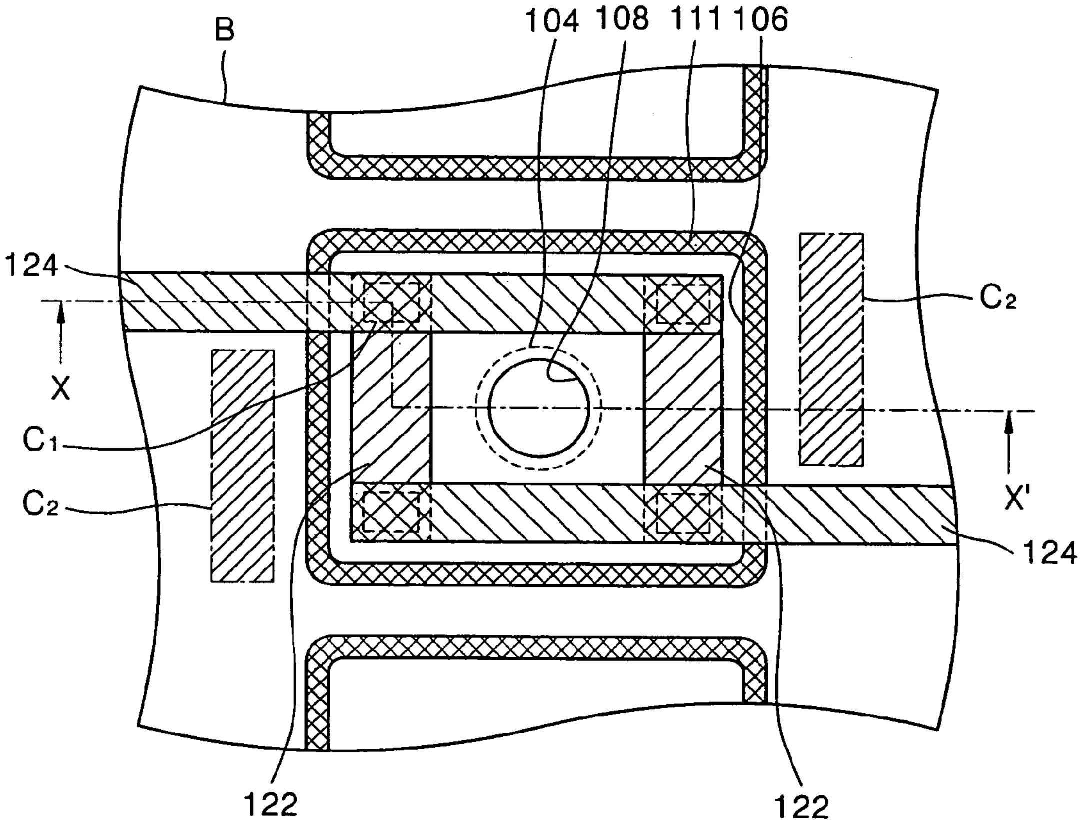
FIG. 5 illustrates an enlarged plan view of a portion B of FIG. 4 showing a shape and disposition of an ink passage and a heater.
Figure 6:
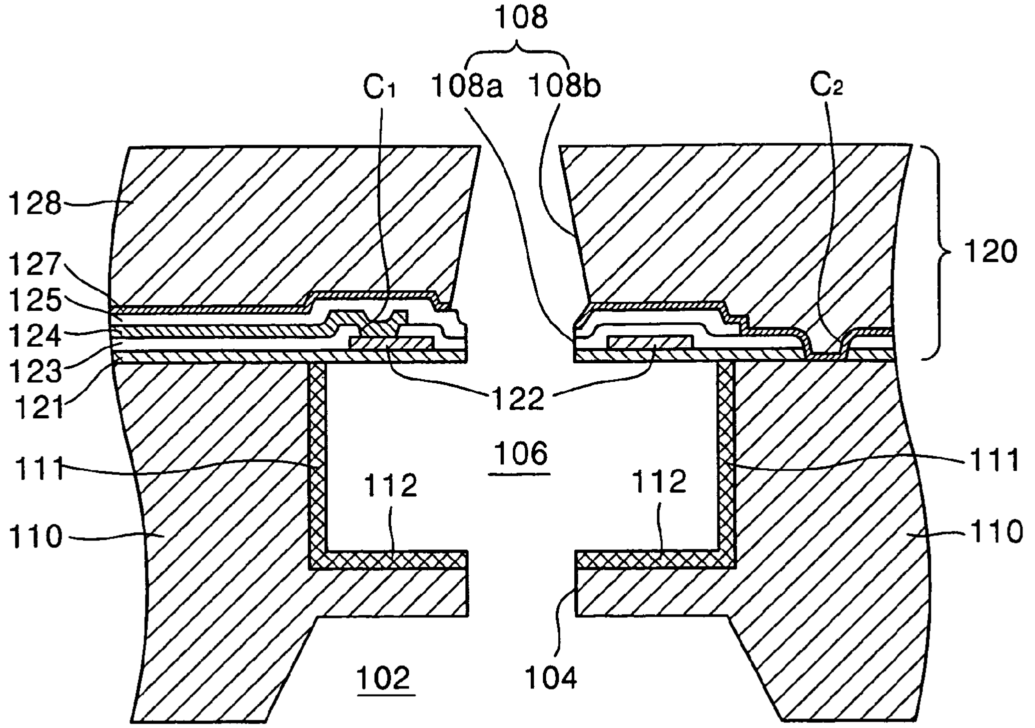
FIG. 6 illustrates a vertical cross-sectional view of the ink-jet printhead taken along line X-X' of FIG. 5.

FIG. 5 illustrates an enlarged plan view of a portion B of FIG. 4 illustrating a shape and disposition of an ink passage and a heater. FIG. 6 illustrates a cross-sectional view of a vertical structure of the ink-jet printhead taken along line X-X' of FIG. 5.

Referring to FIGS. 5 and 6, the ink-jet printhead includes an ink passage, which includes a manifold 102, an ink channel 104, an ink chamber 106, and a nozzle 108.

The ink chamber 106 to be filled with ink is formed on a front surface of a substrate 110 to a predetermined depth, preferably, about 10-80 μm. Side surfaces of the ink chamber 106 are defined by sidewalls 111 that define the planar shape and a width of the ink chamber 106. A bottom surface of the ink chamber 106 is defined by a bottom wall 112 formed parallel to the front surface of the substrate that defines a depth of the ink chamber 106. The sidewalls 111 and the bottom wall 112 serve as an etch stop during formation of the ink chamber 106 by etching the substrate 110, as will be described later. Thus, the ink chamber 106 can be precisely formed to desired dimensions using the sidewalls 111 and the bottom wall 112. In other words, the ink chamber 106 may have an optimum volume, i.e., an optimum cross-section and depth, at which the ejection performance of ink droplets is improved.

The ink chamber 106 defined by the sidewalls 111 may have a variety of planar shapes. In particular, the ink chamber 106 may have a substantially rectangular shape, e.g., a substantially rectangular shape in which a width of a nozzle disposition direction, i.e., a direction in which a plurality of nozzles is arranged, as shown in FIG. 4, is small and a length of a direction perpendicular to the nozzle disposition direction is large. Since the width of the ink chamber 106 is reduced in this manner, the distance between the adjacent nozzles 108 may be narrowed. Thus, the plurality of nozzles 108 can be densely disposed, resulting in realization of an ink-jet printhead with high DPI at which a high-resolution image is printed.

The sidewalls 111 and the bottom wall 112 are formed of materials other than a material used to form the substrate 110. This difference of materials allows the sidewalls 111 and the bottom wall 112 to serve as an etch stop during formation of the ink chamber 106. Thus, when the substrate 110 is formed of a silicon wafer, the sidewalls 111 and the bottom wall 112 may be formed of silicon oxide.

The manifold 102 is formed on a rear surface of the substrate 110, which is opposite to the front surface of the substrate 110, and is in flow communication with an ink reservoir (not shown) for storing ink. Thus, the manifold 102 supplies ink to the ink chamber 106 from the ink reservoir.

The ink channel 104 is vertically formed through the substrate 110 between the ink chamber 106 and the manifold 102. In the drawings, the ink channel 104 is formed at a position corresponding to a center of the ink chamber 106. Alternatively, the ink channel 104 may be formed at any position that provides flow communication between the ink chamber 106 and the manifold 102. The ink channel 104 may have a variety of cross-sectional shapes, such as a circular shape and a polygonal shape. In addition, one or a plurality of ink channels 104 may be formed depending on a desired ink supply speed.

A nozzle plate 120 is disposed on the substrate 110 on which the ink chamber 106, the ink channel 104, and the manifold 102 are formed. The nozzle plate 120 forms an upper wall of the ink chamber 106. A nozzle 108, which is in flow communication with the ink chamber 106 and through which ink is ejected from the ink chamber 106, is vertically formed through the nozzle plate 120.

The nozzle plate 120 may be formed of a plurality of material layers, i.e., passivation layers, stacked on the substrate 110. The plurality of material layers may include a first passivation layer 121, a second passivation layer 123, a third passivation layer 125, and a heat dissipation layer 128. A plurality of heaters 122 may be disposed between the first passivation layer 121 and the second passivation layer 123. A conductor 124 may be disposed between the second passivation layer 123 and the third passivation layer 125.

The first passivation layer 121 is a lowermost material layer of the plurality of material layers, which are components of the nozzle plate 120, and is formed on the front surface of the substrate 110. The first passivation layer 121 is formed to provide insulation between the heater 122 and the substrate 110 and to protect the heater 122. The first passivation layer 121 may be formed of silicon oxide or silicon nitride.

The heater 122, which heats ink in the ink chamber 106, is disposed on the first passivation layer 121 formed on the ink chamber 106. The heater 122 may be formed of a resistive heating material, such as impurity-doped polysilicon, tantalum-aluminum alloy, tantalum nitride, titanium nitride, or tungsten silicide. The heater 122 is disposed above the ink chamber 106 and separated from the nozzle 108. Specifically, the heaters 122 may be disposed at both sides of the nozzle 108 and may have a substantially rectangular shape, e.g., a substantially rectangular shape having a longer length parallel to a disposition direction of the nozzle 108. Alternatively, only one heater 122 may be formed, and the disposition or shape thereof may be different from that shown in FIG. 5. For example, the heater 122 may be formed in a ring shape to surround the nozzle 108.

The second passivation layer 123 is formed on the first passivation layer 121 and the heater 122. The second passivation layer 123 is formed to provide insulation between the heat dissipating layer 128 formed thereon and the heater 122 formed thereunder and to protect the heater 122. The second passivation layer 123 may be formed of silicon nitride or silicon oxide, like the first passivation layer 121.

The conductor 124, which is electrically connected to the heater 122 and delivers a pulse current to the heater 122, is formed on the second passivation layer 123. A first end of the conductor 124 is connected to both ends of the heater 122 via a first contact hole C, formed through the second passivation layer 123, and a second end of the conductor 124 is electrically connected to a bonding pad (101 of FIG. 4). The conductor 124 may be formed of metal having good electrical conductivity, e.g., aluminum (Al), an aluminum alloy, gold (Au), or silver (Ag).

The third passivation layer 125 is formed on the conductor 124 and the second passivation layer 123. The third passivation layer 125 may be formed of tetraethylorthosilicate (TEOS) oxide or silicon oxide. Preferably, the third passivation layer 125 is formed so that an insulation function of the third passivation layer 125 is not damaged. Further, the third passivation layer 125 is formed on upper portions of the heater 122 and the conductor 124 and at portions adjacent thereto and is not formed at the remaining portions, e.g., at portions beyond an upper portion of the ink chamber 106 in which the conductor 124 is not installed. This selective placement facilitates narrowing a distance between the heat dissipating layer 128 and the substrate 110, thereby reducing thermal resistance and further improving a heat dissipating capability of the heat dissipating layer 128. In addition, the third passivation layer 125 may be formed to a predetermined thickness, e.g., about 0.5-3 μm, so that when a current is applied to the heater 122, a larger amount of heat generated by the heater 122 is transferred to ink within the ink chamber 106 and after delivery of a current to the heater 122 is completed, heat generated by the heater 122 and remaining around the heater 122 is smoothly dissipated to the substrate 110 through the heat dissipating layer 128.

The heat dissipating layer 128 is formed on the third passivation layer 125 and the second passivation layer 123 and thermally contacts the front surface of the substrate 110 via a second contact hole $C_2$ formed through the second passivation layer 123 and the first passivation layer 121. The heat dissipating layer 128 may be formed of a material having good thermal conductivity, e.g., a metallic material, such as nickel (Ni), copper (Cu), aluminum (Al), or gold (Au). In addition, the heat dissipating layer 128 may be formed of one or a plurality of metallic layers. The heat dissipating layer 128 may be formed to a relatively large thickness of about 10-100 μm by electroplating the above-described metallic material on the third passivation layer 125 and the second passivation layer 123. To accomplish this electroplating, a seed layer 127 for electroplating the above-described metallic material may be formed on the third passivation layer 125 and the second passivation layer 123. The seed layer 127 may be formed of a metallic material having good electrical conductivity, such as copper (Cu), chromium (Cr), titanium (Ti), gold (Au), and nickel (Ni). In addition, the seed layer 127 may be formed of at least one metallic layer.

As described above, since the heat dissipating layer 128 formed of metal is formed by electroplating, the heat dissipating layer 128 may be formed integrally with the other elements of the ink-jet printhead and may be formed to a relatively large thickness to dissipate heat effectively.

In operation, the heat dissipating layer 128 dissipates heat generated by the heater 122 and remaining around the heater 122 while contacting the front surface of the substrate 110 via the second contact hole $C_2$. More specifically, heat generated by the heater 122 and remaining around the heater 122 after ink is ejected is dissipated to the substrate 110 and out of the printhead via the heat dissipating layer 128. Thus, heat is dissipated after ink is ejected, and the temperature around the nozzle 108 rapidly decreases so that printing can be performed stably at a high driving frequency.

As described above, since the heat dissipating layer 128 may be formed to a relatively large thickness, the nozzle 108 can be formed to have a sufficient length. Thus, a stable high-speed operation can be performed, and a linearity of ink droplets ejected through the nozzle 108 is improved, i.e., ink droplets can be ejected in a direction exactly perpendicular to the substrate 110.

In this particular embodiment, each of the plurality of nozzles 108 includes a lower nozzle 108*a* and an upper nozzle 108*b* formed through the nozzle plate 120. The lower nozzle 108*a* has a cylindrical shape and is formed through the first, second, and third passivation layers 121, 123, and 125. The upper nozzle 108*b* is formed through the heat dissipating layer 128. Although the upper nozzle 108*b* may have a cylindrical shape, the upper nozzle 108*b* may have a tapered shape such that a diameter thereof decreases in a direction of an outlet, as shown in FIG. 6. Since the upper nozzle 108*b* has a tapered shape, a meniscus at a surface of ink in the nozzle 108 is more quickly stabilized after ink is ejected.

Figure 7:
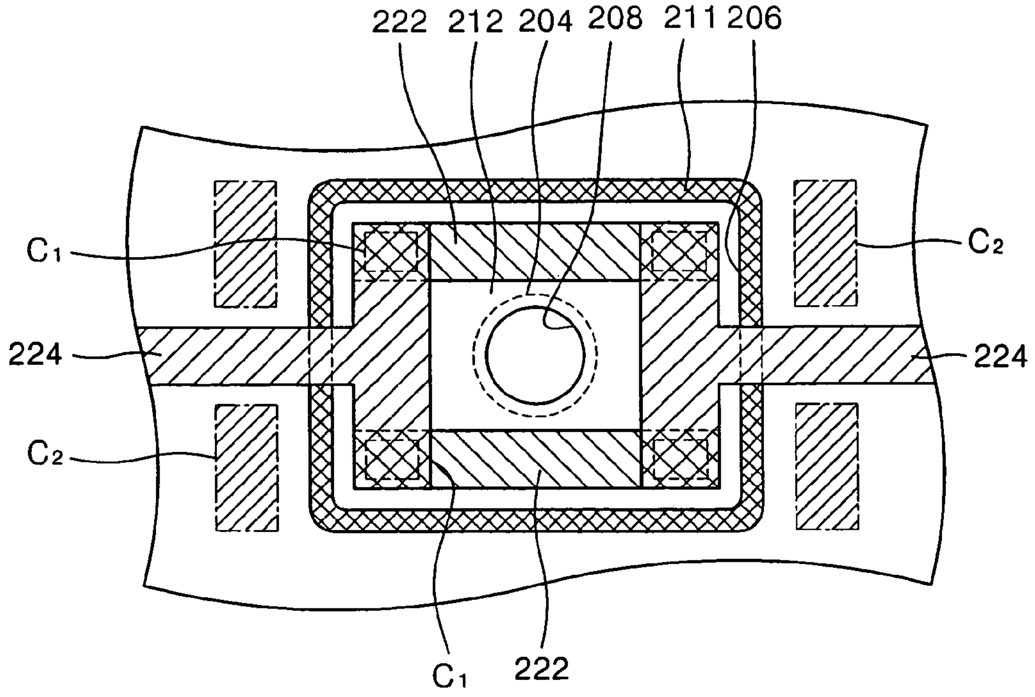
FIG. 7 illustrates a plan view of an ink-jet printhead according to a second embodiment of the present invention.

FIG. 7 illustrates a plan view of a structure of a monolithic ink-jet printhead according to a second embodiment of the present invention. The structure of the monolithic ink-jet printhead shown in FIG. 7 is similar to the structure of the monolithic ink-jet printhead according to the first embodiment of the present invention, as shown in FIGS. 5 and 6. Accordingly, the second embodiment will be described only with respect to a difference between the first and second embodiments.

Referring to FIG. 7, an ink chamber 206, which is defined by sidewalls 211 and a bottom wall 212, has a substantially rectangular shape, e.g., a substantially rectangular shape in which a width of a nozzle disposition direction is small and a length of a direction perpendicular to the nozzle disposition direction is large. A nozzle 208 and an ink channel 204 are formed at a position corresponding to the center of the ink chamber 206. A plurality of heaters 222 are formed on the ink chamber 206. The heaters 222 are disposed at both sides of the nozzle 208 and may have a substantially rectangular shape, e.g., a substantially rectangular shape having a longer length parallel to a lengthwise direction of the ink chamber 206. A conductor 224 is connected to both ends of the heater 222 via a first contact hole $C_1$. Second contact holes $C_2$, through which a heat dissipating layer electrically contacts a substrate, are formed at both sides of the ink chamber 206.

Figure 8:
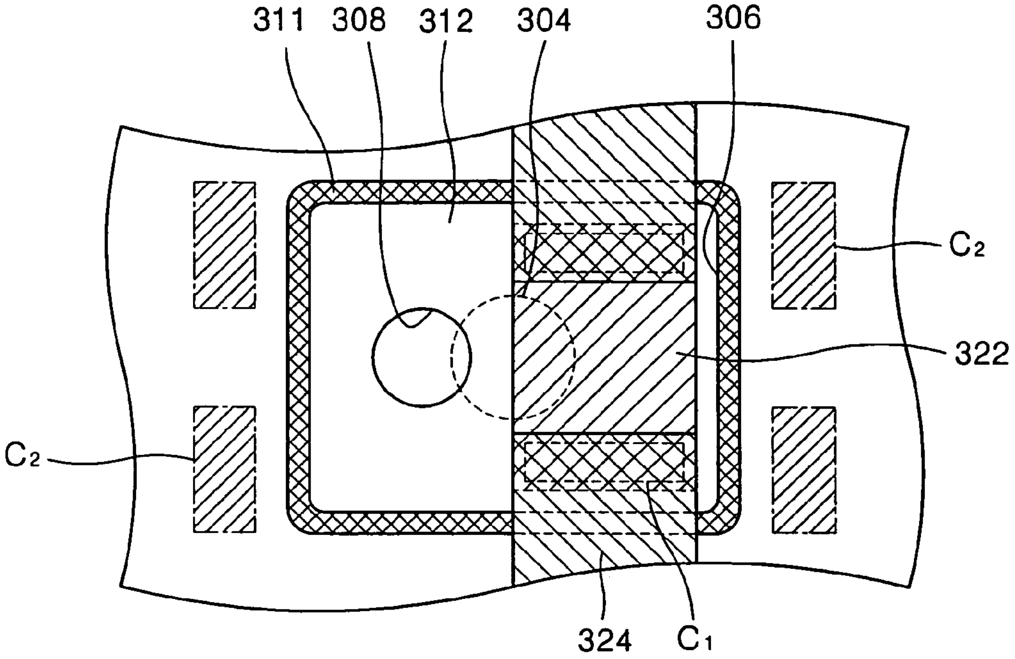
FIG. 8 illustrates a plan view of an ink-jet printhead according to a third embodiment of the present invention.

FIG. 8 illustrates a plan view of a monolithic ink-jet printhead according to a third embodiment of the present invention. The structure of the monolithic ink-jet printhead shown in FIG. 8 is similar to the structure of the monolithic ink-jet printhead according to the first embodiment of the present invention, as shown in FIGS. 5 and 6. Accordingly, the third embodiment will be described only with respect to a difference between the first and third embodiments.

Referring to FIG. 8, an ink chamber 306 defined by sidewalls 311 and a bottom wall 312 has a substantially rectangular shape, e.g., a substantially rectangular shape in which a width of a nozzle disposition direction is small and a length of a direction perpendicular to the nozzle disposition direction is large. In this third embodiment, an ink channel 304 is formed at a position corresponding to the center of the ink chamber 306 whereas a nozzle 308 is formed offset from the lengthwise center of the ink chamber 306. A plurality of heaters 322 are formed on the ink chamber 306. The heaters 322 are disposed at one side of the nozzle 308 and may have a substantially rectangular shape, e.g., a substantially rectangular shape having a longer length parallel to a widthwise direction of the ink chamber 306. A conductor 324 is connected to both ends of the heater 322 via a first contact hole $C_1$. Second contact holes $C_2$ through which a heat dissipating layer electrically contacts a substrate are formed at both sides of the ink chamber 306.

Figure 9:
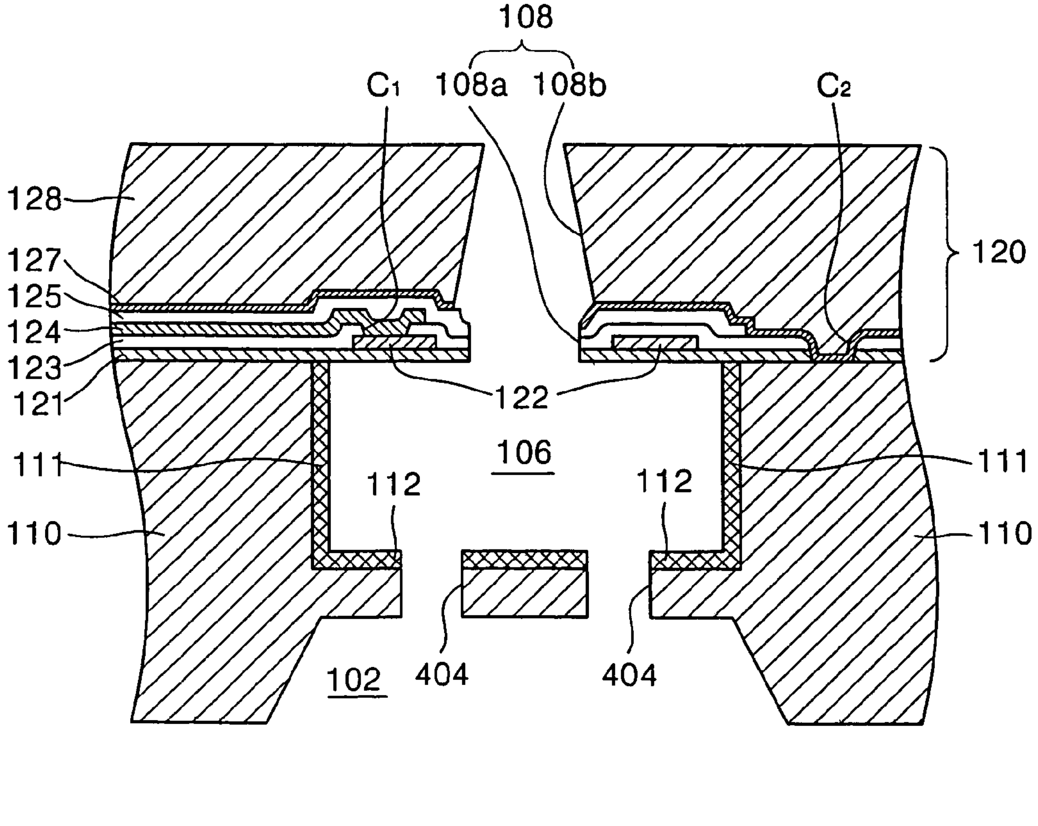
FIG. 9 illustrates a vertical cross-sectional view of an ink-jet printhead according to a fourth embodiment of the present invention.

FIG. 9 illustrates a plan view of a monolithic ink-jet printhead according to a fourth embodiment of the present invention. The structure of the monolithic ink-jet printhead shown in FIG. 9 is similar to the structure of the monolithic ink-jet printhead according to the first embodiment of the present invention, as shown in FIGS. 5 and 6. Accordingly, the fourth embodiment will be described only with respect to a difference between the first and fourth embodiments.

Referring to FIG. 9, two or more ink channels 404 provide flow communication between a manifold 102 formed on a rear surface of a substrate 110 and an ink chamber 106 formed on a front surface of the substrate 110. In this configuration, because the cross-section of each ink channel 404 can be reduced without a reduction in ink supply speed, backflow of ink while ink droplets are ejected may be more easily suppressed, and foreign substances may be prevented from mixing into the ink chamber 106 from the manifold 102.

An operation of ejecting ink from the monolithic ink-jet printhead shown in FIG. 5 according to the first embodiment of the present invention will now be described with reference to FIGS. 10A through 10D.

Figure 10A:
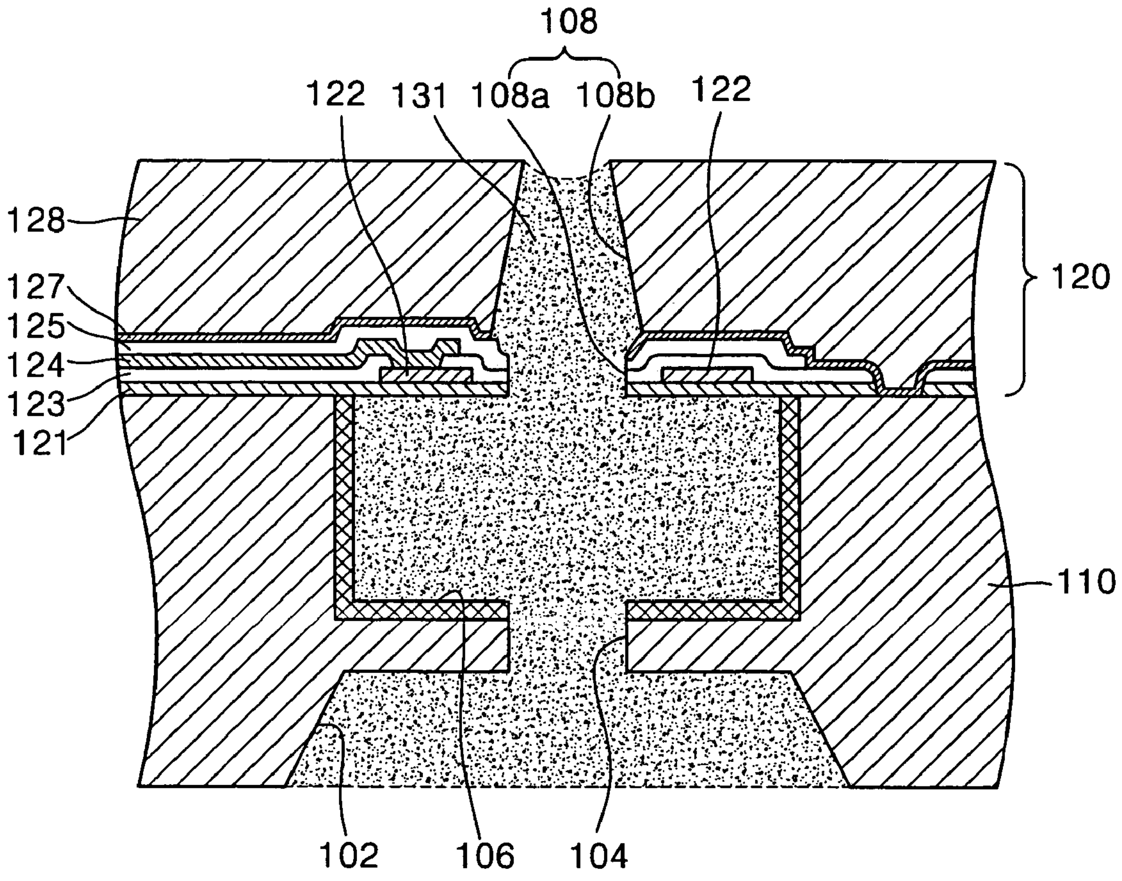
FIGS. 10A through 10D illustrate an operation of ejecting ink from an ink-jet printhead shown in FIG. 5 according to the first embodiment of the present invention.
Figure 10B:
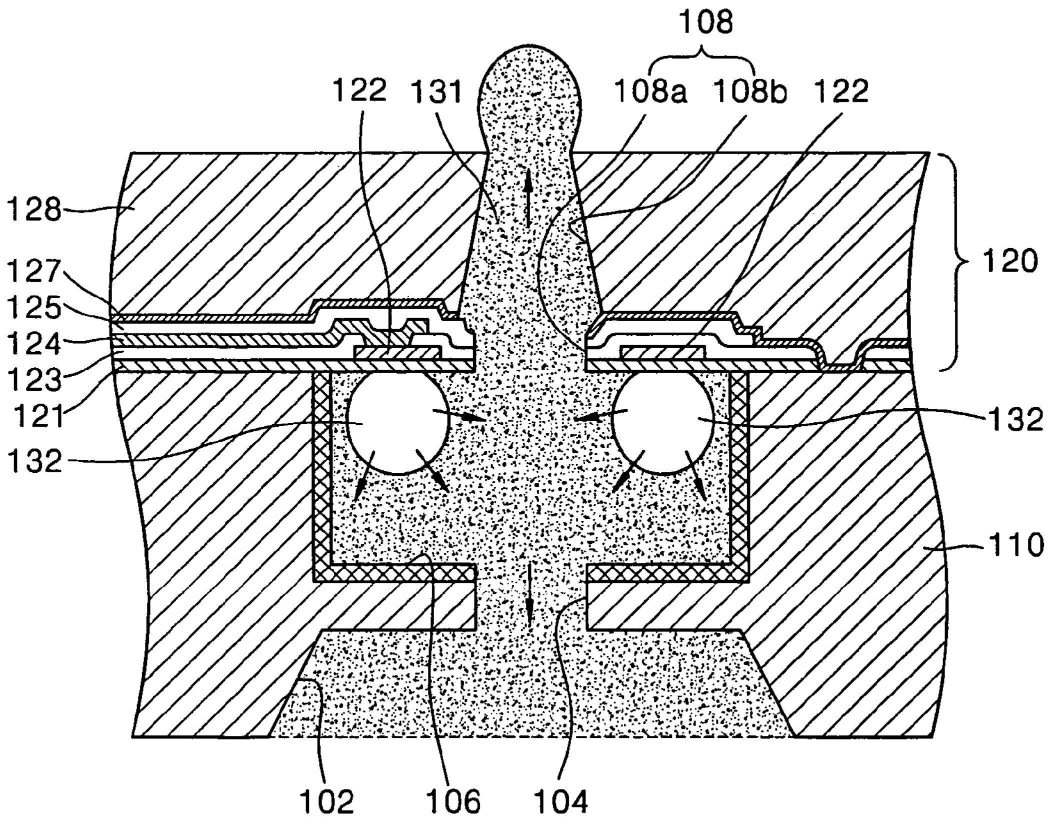

Referring to FIG. 10A, if a pulse current is applied to the heater 122 via the conductor 124 in a state in which the ink chamber 106 and the nozzle 108 are filled with ink, heat is generated by the heater 122 and transferred to the ink 131 in the ink chamber 106 through the first passivation layer 121 formed under the heater 122. As a result, as shown in FIG. 10B, the ink 131 boils, and a bubble 132 is generated. The bubble 132 expands due to a continuous supply of heat, causing ink to be ejected through the nozzle 108.

Figure 10C:
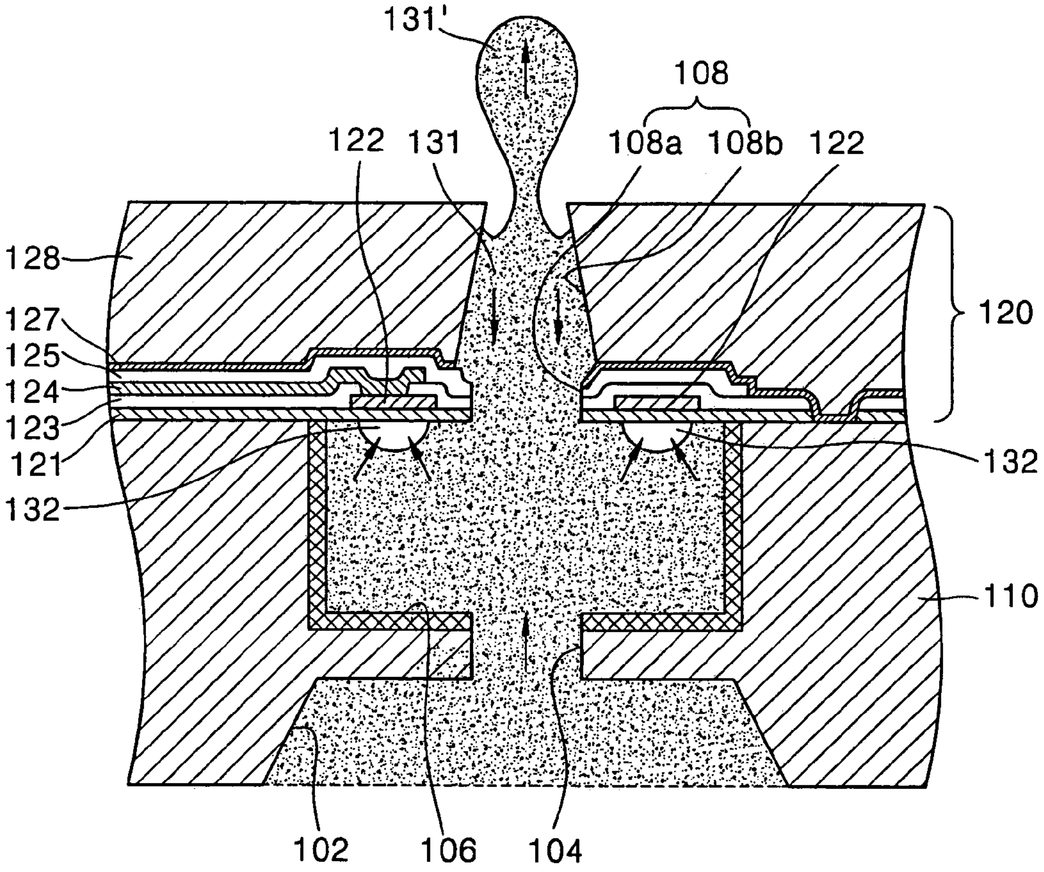

Referring to FIG. 10C, when the applied current is cut off at a subsequent time when the bubble 132 expands to the maximum, the bubble 132 contracts and collapses, causing the ink 131 in the nozzle 108 to be returned to the ink chamber 106. Simultaneously, a portion of the ink pushed to the outside of the nozzle 108 is separated from the ink 131 remaining in the nozzle 108 and an ink droplet 131' is ejected due to an inertia force.

A meniscus at the surface of the ink 131 in the nozzle 108 after the droplets 131' are separated retreats toward the ink chamber 106. In this configuration, because the nozzle 108 is formed to have a sufficient length by the nozzle plate 120, the meniscus retreats only into the nozzle 108 and does not retreat into the ink chamber 106. Thus, air is prevented from flowing into the ink chamber 106, the meniscus is quickly returned to an initial state thereof, and high-speed ejection of the droplets 131' can be performed stably. In addition, since heat generated by the heater 122 and remaining around the heater 122 after the droplets 131' are ejected is dissipated to the substrate 110 and out of the printhead via the heat dissipating layer 128, the temperature of the heater 122, the nozzle 108, and the temperature around the heater 122 and the nozzle 108 decrease rapidly.

Figure 10D:
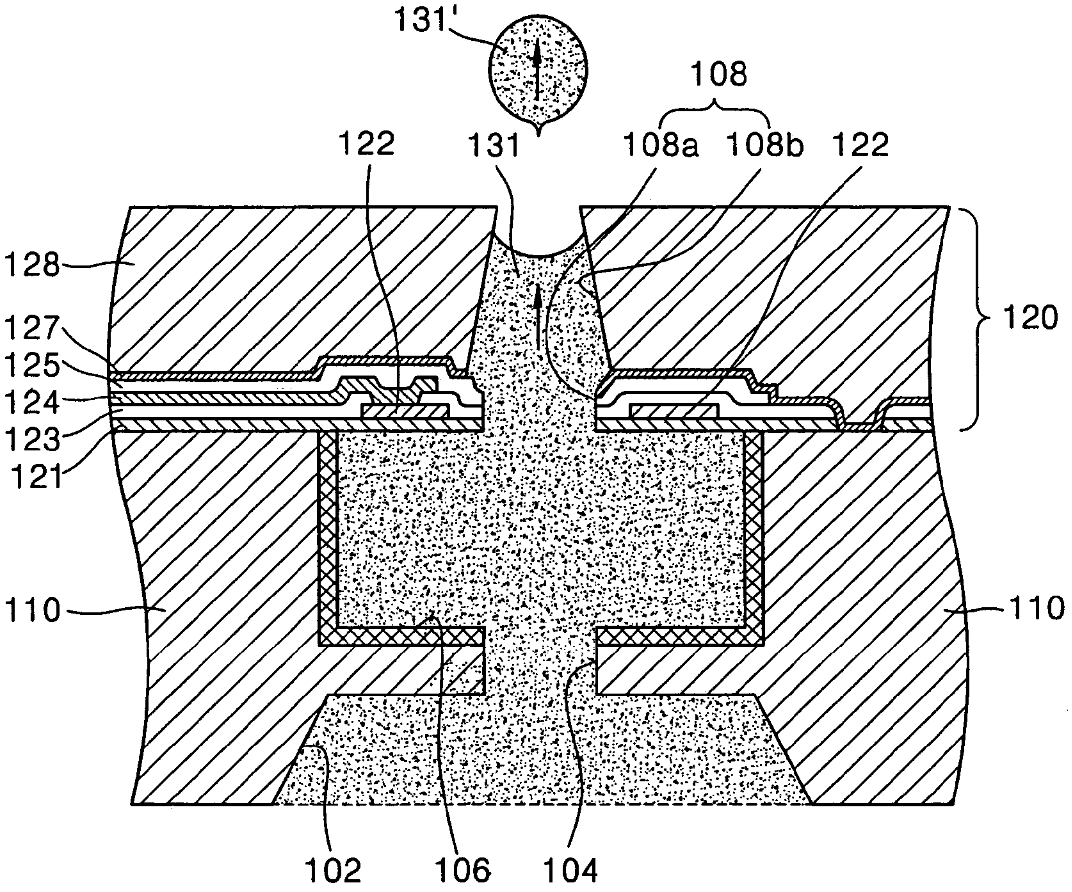

Referring to FIG. 10D, if negative pressure is no longer present in the ink chamber 106 due to a surface tension acting on the meniscus at the surface of ink in the nozzle 108, the ink 131 rises toward an outlet end of the nozzle 108. In this particular embodiment, because the upper nozzle **108*b* has a tapered shape, the rising speed of the ink 131 is faster than for a uniform shape. As a result, the ink 131 supplied through the ink channel 104 is refilled in the ink chamber 106. If a refill operation of the ink 131 is completely performed and the ink 131 is returned to its initial state, the above-described steps are repeatedly performed. In this procedure, heat is dissipated through the heat dissipating layer 128, and the ink 131** is quickly returned to its initial thermal state.

A method of manufacturing a monolithic ink-jet printhead having the above structure according to the first embodiment of the present invention will now be described.

FIGS. 11 through 22 illustrate cross-sectional views of stages in a method of manufacturing a monolithic ink-jet printhead shown in FIG. 5 according to the present invention. Meanwhile, a method of manufacturing a monolithic ink-jet printhead shown in FIGS. 7 through 9 is substantially the same as the method of manufacturing the monolithic ink-jet printhead that will be described as below, and thus, will be described only briefly in the following descriptions.

Figure 11:
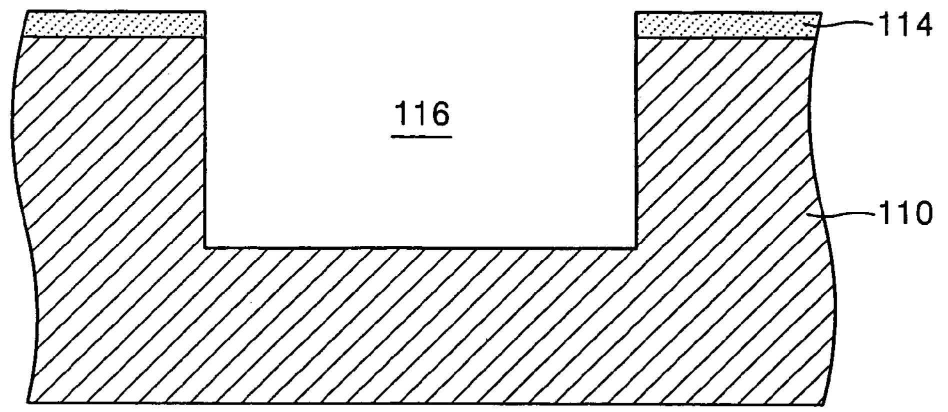
FIGS. 11 through 22 illustrate cross-sectional views of stages in a method of manufacturing the ink-jet printhead shown in FIG. 5 according to the first embodiment of the present invention.

FIG. 11 illustrates a stage in which a groove having a predetermined depth is formed on the front surface of the substrate 110. Referring to FIG. 11, in the present embodiment, a silicon wafer is processed to a thickness of about 300-700 μm and is used as the substrate 110. Silicon wafers are widely used to manufacture semiconductor devices, and thus, facilitate mass production of a printhead.

While FIG. 11 illustrates only a portion of a silicon wafer, several tens to hundreds of chips corresponding to ink-jet printheads may be contained in a single wafer.

An etch mask 114 for defining a portion of the substrate 110 to be etched is formed on an upper, i.e., the front, surface of the silicon substrate 110. A photoresist is coated on the upper surface of the substrate 110 to a predetermined thickness and is patterned, thereby forming the etch mask 114.

Subsequently, the substrate 110 exposed by the etch mask 114 is etched, thereby forming a groove 116 having the predetermined depth. The substrate 110 may be etched by a dry etching, such as a reactive ion etching (RIE). The groove 116 defines an area in which the ink chamber is to be formed. Preferably, the groove 116 has a depth of about 10-80 μm. The groove 116 may have a variety of shapes depending on the shape in which the front surface of the substrate 110 is etched by designing the planar shape of the ink chamber. Thus, the ink chamber can be formed to have desired size and shape, e.g., having a planar, substantially rectangular shape. After the groove 116 is formed, the etch mask 114 is removed from the substrate 110.

Figure 12:
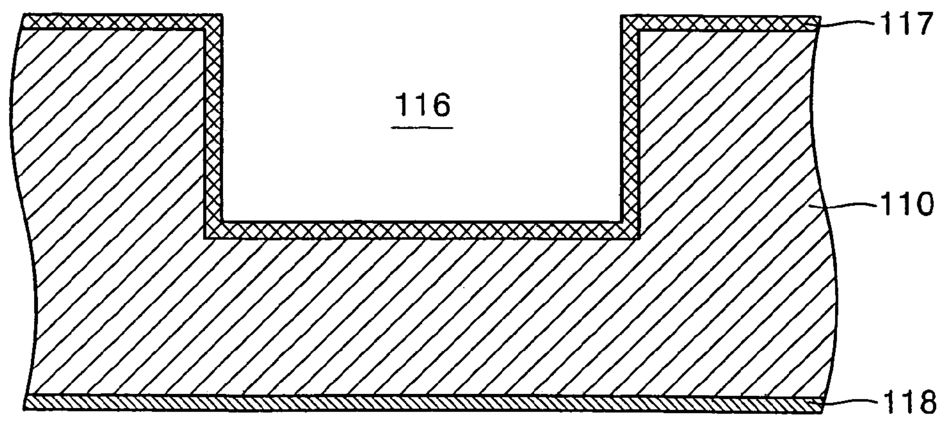

Subsequently, as shown in FIG. 12, the silicon substrate 110, on which the groove 116 is formed, is oxidized to form the silicon oxide layers 117 and 118 on the front and rear surfaces of the substrate 110, respectively. Portions of the silicon oxide layer 117 formed on the front surface of the substrate 110, which is formed at the sides of the groove 116, are sidewalls for defining side surfaces of the ink chamber. A portion of the silicon oxide layer 117, which is formed at a bottom surface of the groove 116, is a bottom wall for defining the bottom surface of the ink chamber. Since the sidewalls and the bottom wall are formed of a material other than a material used in forming the substrate 110, the sidewalls and the bottom wall serve as an etch stop during a formation of the ink chamber, which will be described later.

Figure 13:
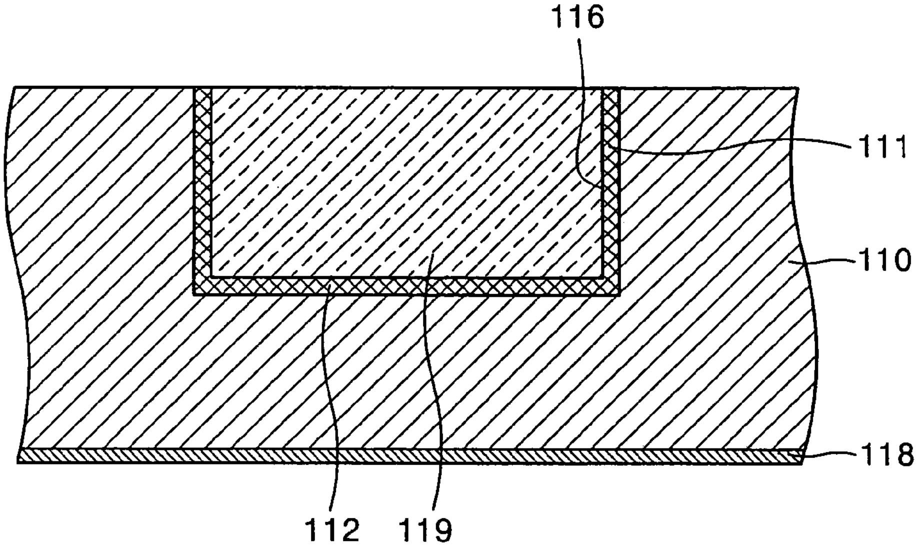

FIG. 13 illustrates a stage in which a sacrificial layer 119 is formed in the groove formed in the substrate 110 and the front surface of the substrate 110 is planarized.

Specifically, for this particular embodiment, a polysilicon layer is formed in the groove 116, and the polysilicon layer is epitaxially grown, thereby forming the sacrificial layer 119 completely filling the groove 116. Subsequently, an upper surface of the sacrificial layer 119 and the front surface of the substrate 110 are planarized, e.g., by a chemical mechanical polishing (CMP) process. Here, the silicon oxide layer 117 formed on the front surface of the substrate 110 is removed, but the sidewalls 111 and the bottom wall 112, which will serve as an etch stop as described above, remain on the sides and bottom surface of the groove 116.

Figure 14:
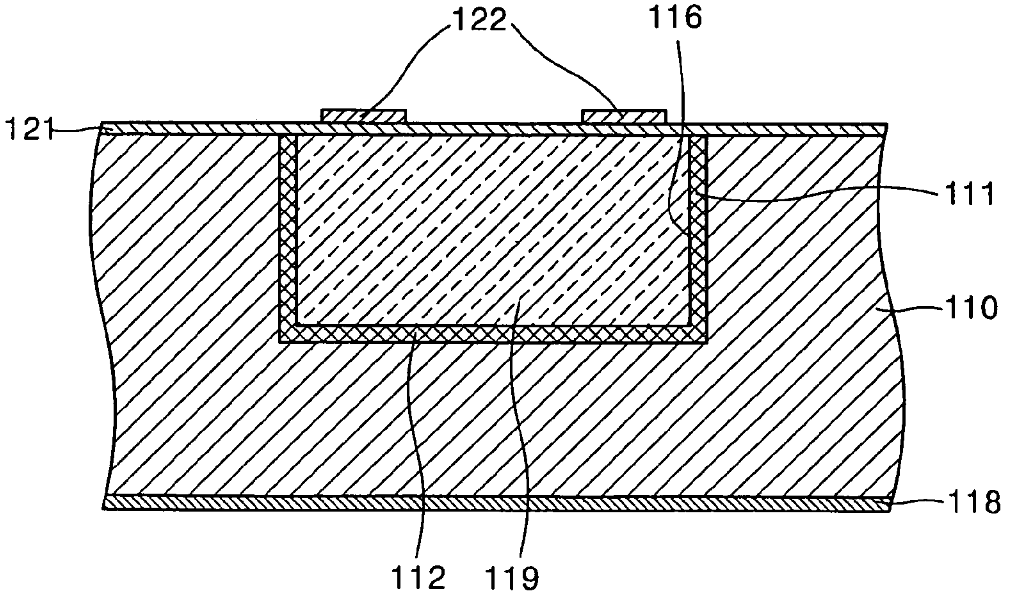

FIG. 14 illustrates a stage in which a first passivation layer and a heater are formed on the front surface of the substrate and the sacrificial layer.

Specifically, the first passivation layer 121 may be formed by depositing silicon oxide or silicon nitride on the front surface of the substrate 110 and the sacrificial layer 119.

Subsequently, the heater 122 is formed on the first passivation layer 121 formed on the front surface of the substrate 110 and the sacrificial layer 119. The heater 122 may be formed by depositing a resistive heating material, such as impurity-doped polysilicon, tantalum-aluminum alloy, tantalum nitride, or tungsten silicide, on the entire surface of the first passivation layer 121 to a predetermined thickness and patterning the deposited material in a predetermined shape, e.g., in a substantially rectangular shape. Specifically, impurity-doped polysilicon may be formed to a thickness of about 0.7-1 μm by depositing polycrystalline silicon together with impurities, e.g., a source gas of phosphorous (P), by low-pressure chemical vapor deposition (LP-CVD). When the heater 122 is formed of tantalum-aluminum alloy, tantalum nitride, or tungsten silicide, the heater 122 may be formed to a thickness of about 0.1-0.3 μm by depositing tantalum-aluminum alloy, tantalum nitride, or tungsten silicide by sputtering or chemical vapor deposition (CVD). The deposition thickness of the resistive heating material may be varied to have proper resistance in consideration of the width and length of the heater 122. Subsequently, the resistive heating material deposited on the entire surface of the first passivation layer 121 is patterned by a photolithographic process using a photomask and a photoresist and an etch process using a photoresist pattern as an etch mask.

Figure 15:
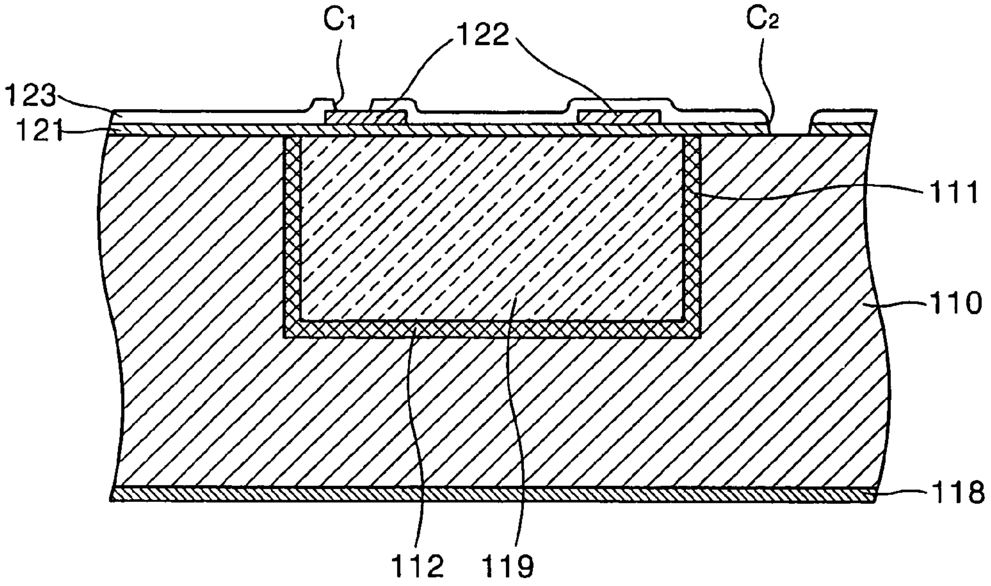
Figure 16:
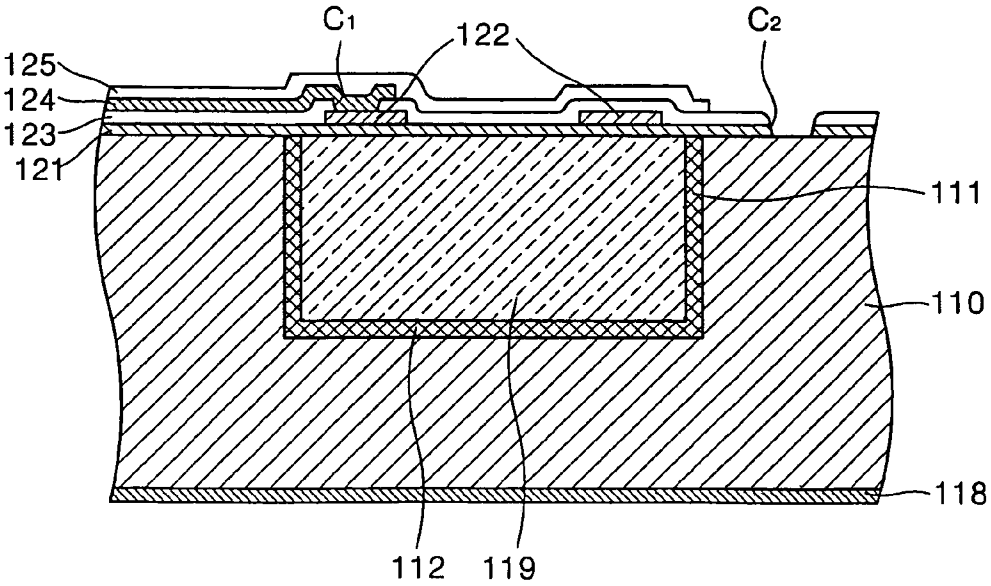

Next, as shown in FIG. 15, the second passivation layer 123 is formed on the upper surface of the first passivation layer 121 and the heater 122. Specifically, the second passivation layer 123 may be formed by depositing silicon oxide or silicon nitride to a thickness of about 0.05-1 μm. Subsequently, part of the second passivation layer 123 is etched to form the first contact hole $C_1$ through which part of the heater 122, that is, portions to be connected to the conductor 124 in the step shown in FIG. 16, is exposed. In addition, the second passivation layer 123 and the first passivation layer 121 are etched sequentially to form the second contact hole $C_2$ through which part of the substrate 110, i.e., a portion to be connected to the heat dissipating layer that will be formed later is exposed. The first and second contact holes $C_1$ and $C_2$ may be formed at the same time.

FIG. 16 illustrates a state in which the conductor and the third passivation layer are formed on the upper surface of the second passivation layer 123. Specifically, the conductor 124 may be formed by depositing metal having good conductivity, such as aluminum (Al), an aluminum alloy, gold (Au), or silver (Ag), on the upper surface of the second passivation layer 123 to a thickness of about 0.5-2 μm by sputtering and patterning the deposited metal. Then, the conductor 124 is connected to the heater 122 via the first contact hole $C_1$.

Next, the third passivation layer 125 is formed on upper surfaces of the second passivation layer 123 and the conductor 124. The third passivation layer 125 is a material layer that provides insulation between the conductor 124 and the heat dissipating layer, which will be formed later. The third passivation layer 125 may be formed to a thickness of about 0.5-3 μm by depositing TEOS oxide using plasma enhanced chemical vapor deposition (PE CVD). Subsequently, a portion of the third passivation layer 125 is etched to expose a portion of the second passivation layer 123 away from upper portions of the heater 122 and the conductor 124 and portions adjacent to the heater 122 and the conductor 124 within a range in which an insulation function of the third passivation layer 125 is not damaged. In this embodiment, at least portions of the second passivation layer 123 out of the upper portion of the ink chamber 106 in which the conductor 124 is not disposed are exposed. Simultaneously, the substrate 110 is also exposed via the second contact hole $C_2$. As a result, a distance between the heat dissipating layer and the substrate 110 is narrowed, thermal resistance is reduced, and a heat dissipating capability of the heat dissipating layer is improved.

Figure 17:
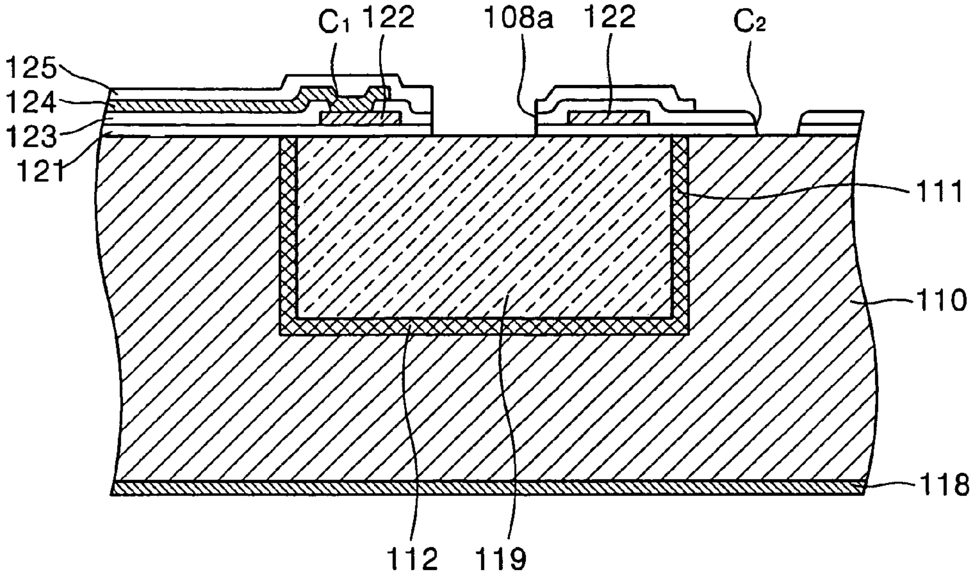

FIG. 17 illustrates a stage in which a lower nozzle is formed. Referring to FIG. 17, a lower nozzle 108*a* may be formed by sequentially etching the third passivation layer 125, the second passivation layer 123, and the first passivation layer 121 by RIE. In this particular embodiment, a portion of the sacrificial layer 119 formed on the front surface of the substrate 110 is exposed through the lower nozzle 108*a*.

Figure 18:
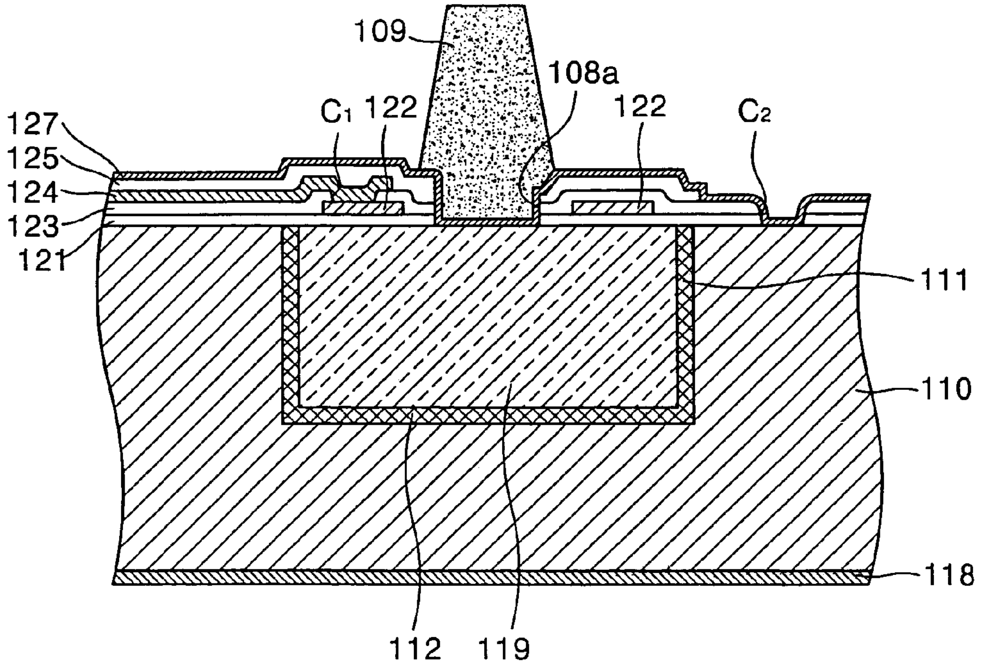

Next, as shown in FIG. 18, a seed layer 127 for electroplating is formed on the entire surface of the structure shown in FIG. 17. For electroplating, the seed layer 127 may be formed to a thickness of about 500-3000 Å by depositing metal having good conductivity, such as copper (Cu), chromium (Cr), titanium (Ti), gold (Au), or nickel (Ni), by sputtering. Alternatively, the seed layer 127 may be formed of a plurality of metallic layers.

Subsequently, a plating mold 109 for forming an upper nozzle is formed. The plating mold 109 may be formed by coating a photoresist on the entire surface of the seed layer 127 to a predetermined thickness and patterning a coated photoresist in the shape of the upper nozzle. Meanwhile, the plating mold 109 may be formed of a photoresist or photosensitive polymer. Specifically, a photoresist is coated on the entire surface of the seed layer 127 to a thickness greater than the height of the upper nozzle. In this embodiment, the photoresist is also filled in the lower nozzle 108*a*. Subsequently, the photoresist is patterned, and only portions in which the upper nozzle is to be formed and portions filled in the lower nozzle 108*a* are left. In this particular embodiment, the photoresist is patterned to have a tapered shape such that a diameter thereof decreases in an upward direction. The patterning step may be performed by proximity exposure in which the photoresist is exposed through a photomask, which is isolated a predetermined distance from an upper surface of the photoresist. In this embodiment, light that has passed through the photomask is diffracted. As a result, an interface between an exposed portion and an unexposed portion of the photoresist is formed to be inclined. The inclination degree of the interface and an exposure depth may be adjusted by the distance between the photomask and the photoresist and an exposure energy. Alternatively, the upper nozzle may have a pillar shape. In this alternative embodiment, the photoresist is patterned in the pillar shape.

Alternatively, the step of forming the plating mold 109 may be divided into two steps, that is, a first step of filling an interior of the lower nozzle 108*a* with a photoresist to form a lower plating mold and a second step of forming an upper plating mold to form an upper nozzle 108*b*. In this embodiment, the step of forming the seed layer 127 may be performed between the first step and the second step.

Figure 19:
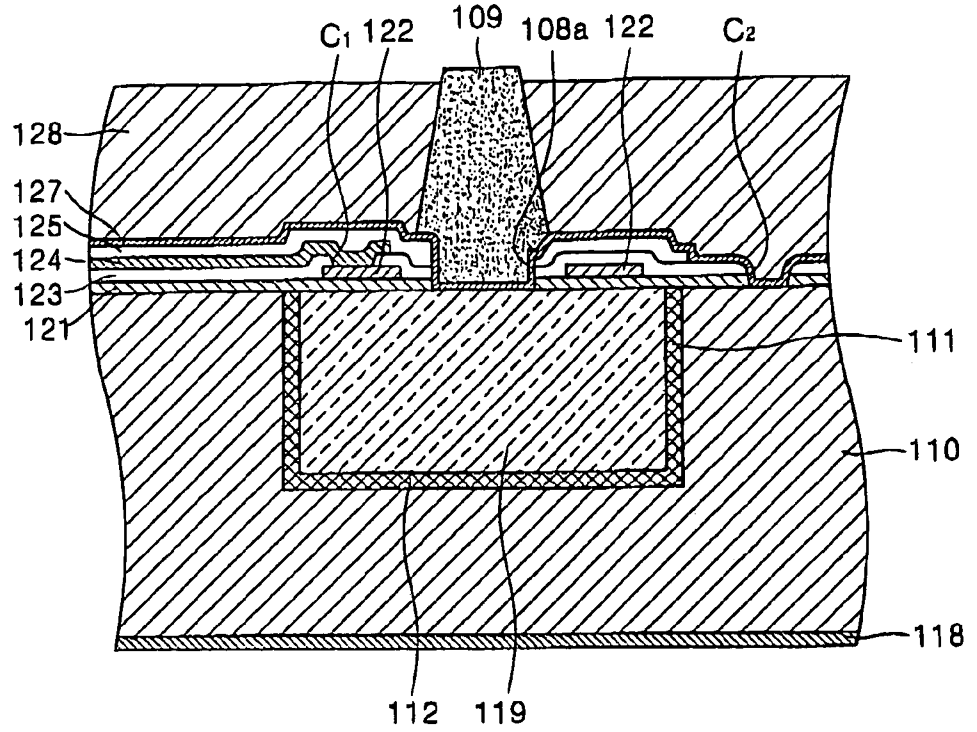

Next, as shown in FIG. 19, the heat dissipating layer 128 formed of a metallic material having a predetermined thickness is formed on an upper surface of the seed layer 127. The heat dissipating layer 128 may be formed to a thickness of about 10-100 μm by electroplating metal having good thermal conductivity, such as nickel (Ni), copper (Cu), aluminum (Al), or gold (Au), on the upper surface of the seed layer 127. In this particular embodiment, the heat dissipating layer 128 may be formed of a plurality of metallic layers. An electroplating process is terminated at a time when the heat dissipating layer 128 is formed up to a height that is lower than a height of the plating mold 109 and in which a cross-section of an outlet of the upper nozzle is formed. The thickness of the heat dissipating layer 128 may be determined in consideration of a cross-sectional area and shape of the upper nozzle 108*b* and a heat dissipating capability to the substrate 110 and out of the printhead.

The surface of the heat dissipating layer 128 after electroplating is completed, is uneven due to the presence of the material layers formed under the heat dissipating layer 128. Thus, the surface of the heat dissipating layer 128 may be planarized by CMP.

Figure 20:
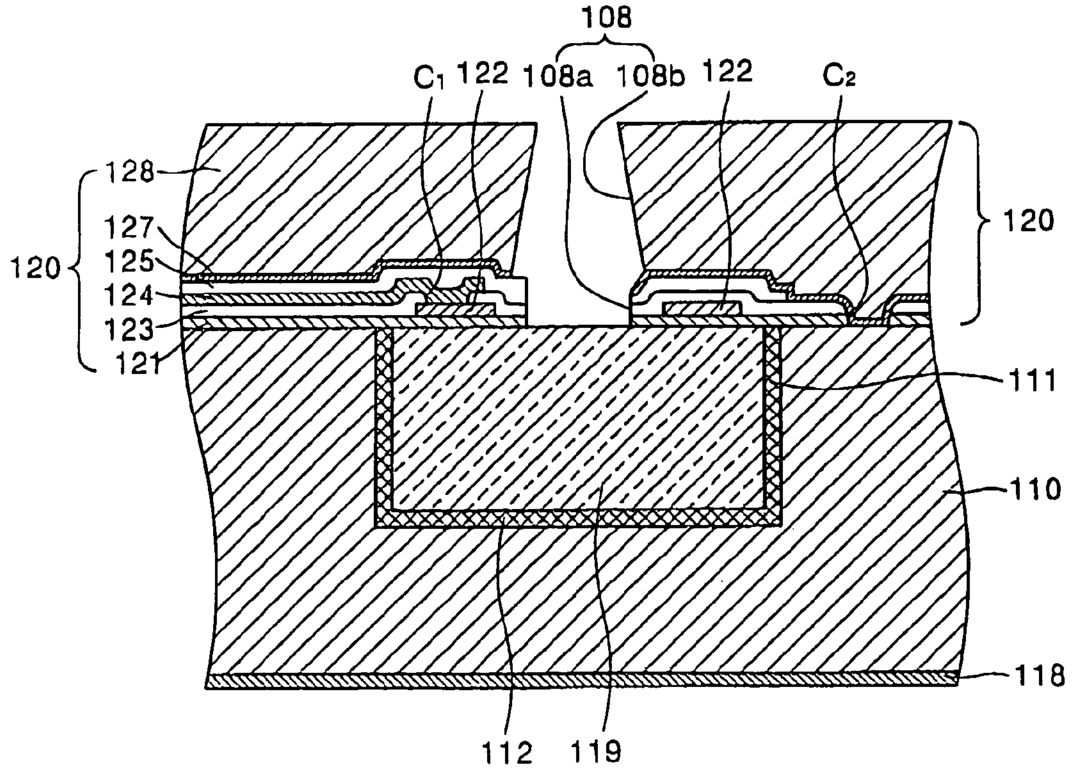

Subsequently, the plating mold 109 is removed, and then, a portion of the seed layer 127 exposed by removing the plating mold 109 is removed. The plating mold 109 may be removed by a general method of removing a photoresist, e.g., using acetone. The seed layer 127 may be etched by a wet etching using an etchant capable of selectively etching the seed layer 127 in consideration of an etch selectivity of the metallic material used in forming the heat dissipating layer 128 to the metallic material used in forming the seed layer 127. For example, when the seed layer 127 is formed of copper (Cu), an acetic acid based etchant may be used. When the seed layer 127 is formed of titanium (Ti), a hydrofluoric acid (HF) based etchant may be used. Then, as shown in FIG. 20, the lower nozzle 108*a* and the upper nozzle 108*b* are in flow communication with each other, thereby forming a complete nozzle 108 and completing the nozzle plate 120 formed of a stack of a plurality of material layers. In this embodiment, a partial surface of the sacrificial layer 119 that occupies a space in which the ink chamber is to be formed, is exposed through the nozzle 108.

Figure 21:
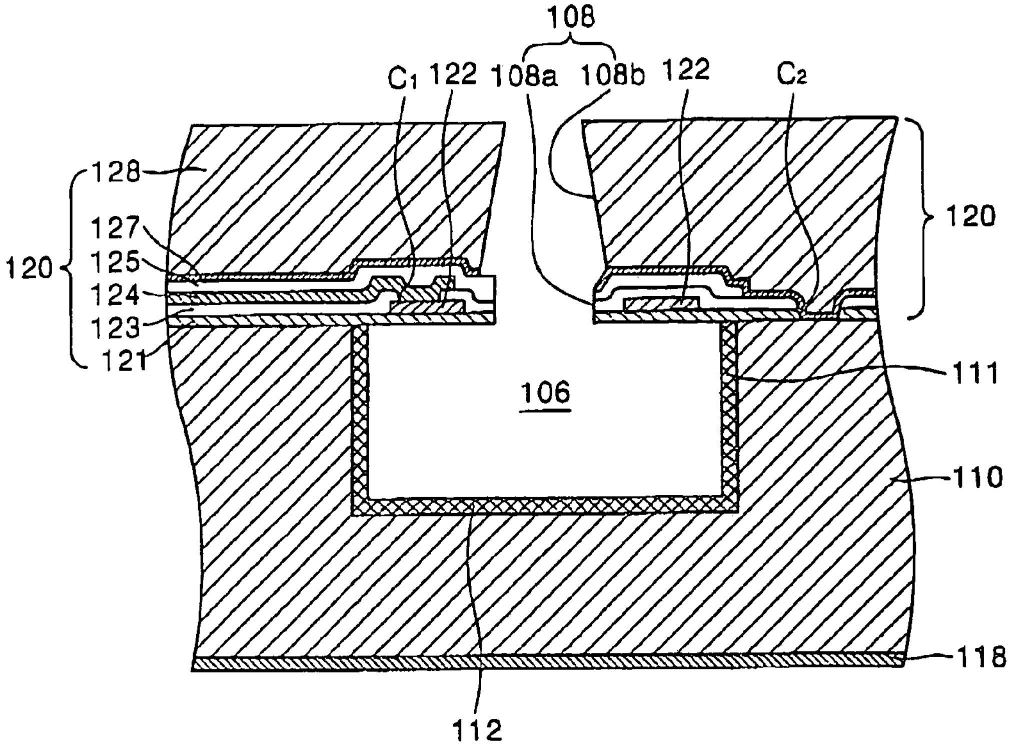

FIG. 21 illustrates a stage in which an ink chamber 106 is formed on the front surface of the substrate 110. The ink chamber 106 may be formed by isotropically etching the sacrificial layer 119 exposed through the nozzle 108. Specifically, the sacrificial layer 119 is dry etched using an etchant, such as $XeF_2$ gas or a $BrF_3$ gas for a predetermined amount of time. In this particular embodiment, since the sacrificial layer 119 is etched isotropically, it is etched at a uniform speed in all directions from a portion exposed through the nozzle 108. However, further etching of sidewalls 111 and bottom wall 112, which serve as an etch stop, is suppressed. As shown in FIG. 21, the ink chamber 106 defined by the sidewalls 111 and the bottom wall 112 is formed. In this embodiment, the depth of the ink chamber 106 is almost the same as the depth of the above-described groove 116, and the planar shape of the ink chamber 106 is defined by the shape of the sidewalls 111.

Figure 22:
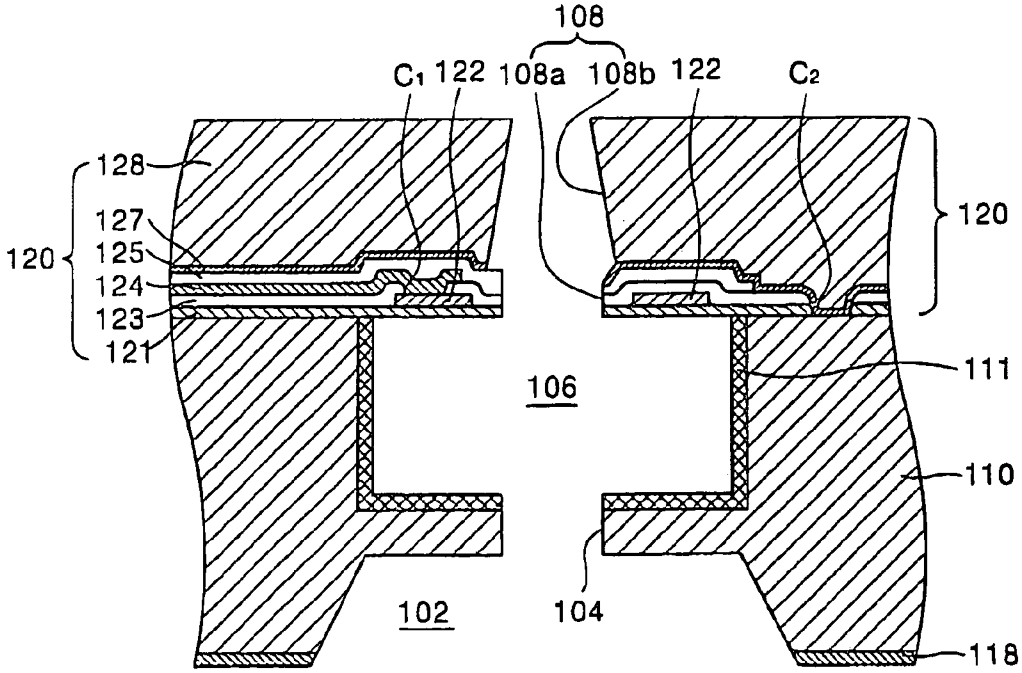

FIG. 22 illustrates a stage in which the manifold 102 and the ink channel 104 are formed by etching the rear surface of the substrate 110. Specifically, a partial area of the silicon oxide layer 118 formed on the rear surface of the substrate 110 is removed to expose the rear surface of the substrate 110. Subsequently, by wet etching the exposed rear surface of the substrate 110 using tetramethyl ammonium hydroxide (TMAH) or potassium hydroxide (KOH) as an etchant, as shown in FIG. 22, the manifold 102 having an inclined side is formed. Meanwhile, the manifold 102 may be formed by anisotropically dry etching the rear surface of the substrate 110. Subsequently, after an etch mask for defining the ink channel 104 is formed on the rear surface of the substrate 110 on which the manifold 102 has been formed, the substrate 110 and the bottom wall 112 between the manifold 102 and the ink chamber 106 are dry etched by RIE, thereby forming the ink channel 104. The ink channel 104 may have a circular shape or a polygonal shape. Further, as shown in FIG. 9, a plurality of ink channels 104 may be formed.

By performing the above-described steps, the monolithic ink-jet printhead having the structure shown in FIG. 22 according to the first embodiment of the present invention is manufactured.

Figure 23:
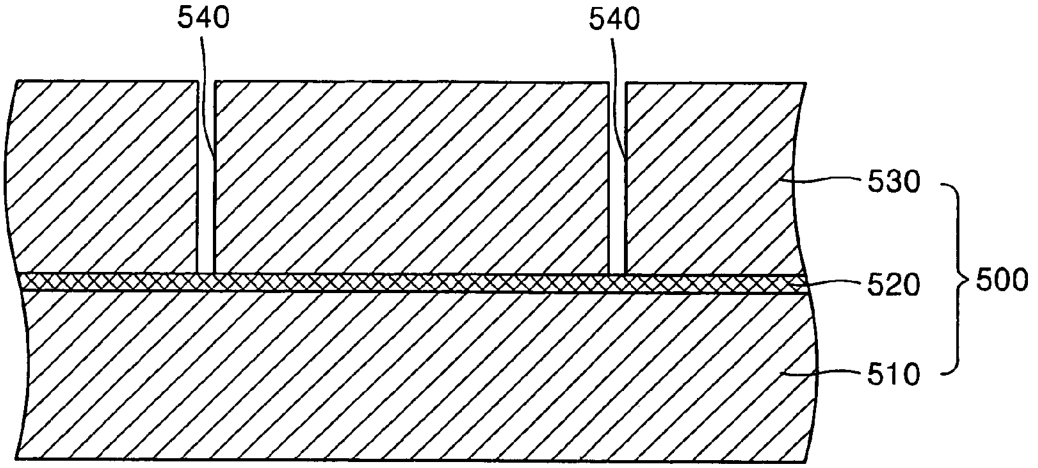
FIGS. 23 and 24 illustrate cross-sectional views of stages in an alternate method of manufacturing an ink-jet printhead according to another embodiment of the present invention.
Figure 24:
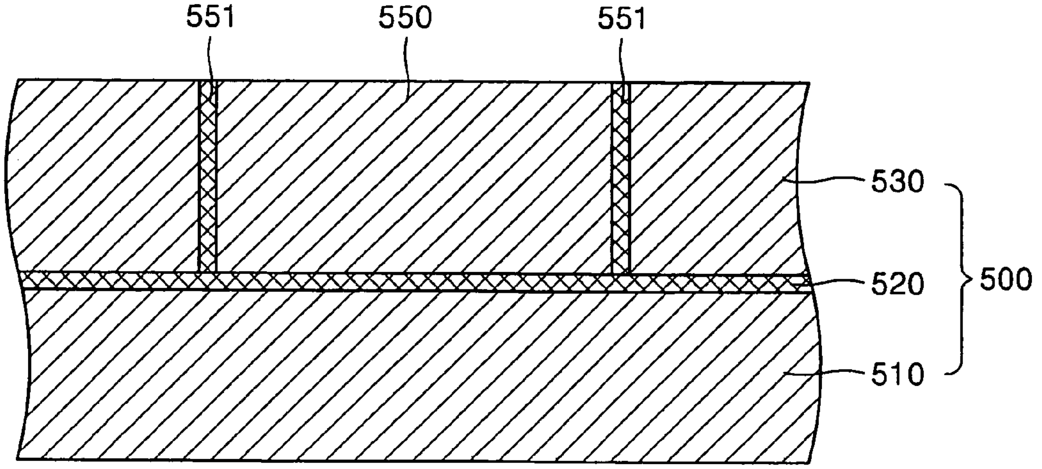

FIGS. 23 and 24 illustrate stages in an alternate method of manufacturing a monolithic ink-jet printhead according to another embodiment of the present invention. This alternate method is the same as the previous method, except with respect to the formation of the sacrificial layer. Accordingly, only the formation of the sacrificial layer will be described below.

As shown in FIG. 23, a silicon-on-insulator (SOI) substrate 500, in which an insulating layer 520 formed of silicon oxide is interposed between two silicon substrates 510 and 530, is used as a substrate. The thickness of the upper silicon substrate 530 is about 10-80 μm, and the thickness of the lower silicon substrate 510 is about 300-700 μm.

Subsequently, the front surface of the upper silicon substrate 530 is etched, thereby forming a trench 540 having a predetermined shape so that the insulating layer 520 is exposed. The upper silicon substrate 530 may be etched by dry etching such as RIE. The trench 540 is formed to surround portions in which an ink chamber is to be formed. The trench 540 is formed to a width of several micrometers (μms) so that it may easily be filled with a predetermined material.

Next, as shown in FIG. 24, the trench 540 is filled with a material different from a material used in forming the silicon substrate 530, e.g., silicon oxide. Then, the surface of the upper silicon substrate 530 is planarized. After this planarization, sidewalls 551 formed of silicon oxide are formed in the trench 540, and portions that are surrounded by the sidewalls 551 and the insulating layer 520 become a sacrificial layer 550 for forming the ink chamber. In this way, the sacrificial layer 550 is formed of silicon, unlike in the previous embodiment in which it was formed of polysilicon, and the sidewalls 551 and the insulating layer 520, which are formed of silicon oxide, serve as an etch stop when forming the ink chamber.

Subsequent steps are the same as the above-described steps shown in FIGS. 14 through 22.

As described above, the monolithic ink-jet printhead and the method of manufacturing the same according to the present invention have several advantages. First, an ink chamber, which has an optimum planar shape and depth defined by sidewalls and a bottom wall that serve as an etch stop is formed such that a distance between adjacent nozzles is narrowed and a monolithic ink-jet printhead with high DPI that is capable of printing a high-resolution image is implemented. Second, since a heat dissipating capability is improved by a heat dissipating layer formed of metal having a relatively large thickness, ejection performance is improved and a driving frequency is increased. In addition, a nozzle can be formed to have a sufficient length. Thus, a meniscus at the surface of ink in the nozzle can be maintained in the nozzle, an ink refill operation can be stably performed, and a linearity of ink droplets ejected through the nozzle may be improved. Third, the shape and dimensions of a heater, a nozzle, an ink chamber, and an ink channel are not closely connected with one another, and a degree of freedom in designing and manufacturing the monolithic ink-jet printhead is high. Thus, ejection performance can be improved, and a driving frequency can easily be increased. Fourth, since a nozzle plate is formed integrally with a substrate having the ink chamber and the ink channel, the monolithic ink-jet printhead can be implemented by a series of processes on a single wafer without any subsequent processes, thereby improving the yield of the monolithic ink-jet printhead and simplifying the process of manufacturing the monolithic ink-jet printhead.

Exemplary embodiments of the present invention have been disclosed herein and, although specific terms are employed, they are used and are to be interpreted in a generic and descriptive sense only and not for purpose of limitation. For example, materials used in forming each element of an ink-jet printhead according to the present invention may be varied. Accordingly, a substrate may be formed of a material having a good processing property other than silicon, and the case of the substrate may also be applied to sidewalls, a bottom wall, a heater, a conductor, passivation layers, and a heat dissipating layer. In addition, methods for depositing and forming each element may be modified. Furthermore, specific dimensions exemplified in each step may be adjusted within the range in which the manufactured printhead operates normally. In addition, the order in which steps of a method of manufacturing the ink-jet printhead are performed may be changed. Accordingly, it will be understood by those of ordinary skill in the art that various changes in form and details may be made without departing from the spirit and scope of the present invention as set forth in the following claims.

What is claimed is:

1. A method of manufacturing a monolithic ink-jet printhead, the method comprising:

forming a sacrificial layer surrounded by sidewalls and a bottom wall on a front surface of a substrate;

sequentially stacking a plurality of passivation layers on the front surface of the substrate and forming a heater and a conductor connected to the heater between adjacent layers of the plurality of passivation layers;

forming a heat dissipating layer on the plurality of passivation layers and forming a nozzle through which ink is ejected through the plurality of passivation layers and the heat dissipating layer to form a nozzle plate on the front surface of the substrate, the nozzle plate including the plurality of passivation layers and the heat dissipating layer;

forming an ink chamber, which is defined by the sidewalls and the bottom wall, by etching the sacrificial layer exposed through the nozzle using the sidewalls and the bottom wall as an etch stop;

forming a manifold for supplying ink by etching a rear surface of the substrate; and forming an ink channel by etching the substrate between the manifold and the ink chamber to provide flow communication between the manifold and the ink chamber.

2. The method as claimed in claim 1, wherein forming the sacrificial layer comprises:

etching the front surface of the substrate to form a groove having a predetermined depth;

oxidizing the front surface of the substrate in which the groove is formed to form the sidewalls and the bottom wall;

filling the groove surrounded by the sidewalls and the bottom wall with a predetermined material to form the sacrificial layer; and planarizing the front surface of the substrate and the sacrificial layer.

3. The method as claimed in claim 2, wherein filling the groove with the predetermined material comprises epitaxially growing polysilicon in the groove.

4. The method as claimed in claim 1, wherein forming the sacrificial layer comprises:

etching an upper silicon substrate of a silicon-on-insulator (SOI) substrate to a predetermined depth to form a trench; and filling the trench with a predetermined material to form the sidewalls.

5. The method as claimed in claim 4, wherein the predetermined material is silicon oxide.

6. The method as claimed in claim 1, wherein forming the plurality of passivation layers comprises:

forming a first passivation layer on the front surface of the substrate;

forming the heater on the first passivation layer;

forming a second passivation layer on the first passivation layer and the heater;

forming the conductor on the second passivation layer; and forming a third passivation layer on the second passivation layer and the conductor.

7. The method as claimed in claim 6, wherein the third passivation layer is formed on upper portions of the heater and the conductor and at portions adjacent thereto.

8. The method as claimed in claim 1, wherein the heat dissipating layer is formed of at least one metallic layer, and each of the at least one metallic layer is formed by electroplating at least one material selected from the group consisting of nickel (Ni), copper (Cu), aluminum (Al), and gold (Au).

9. The method as claimed in claim 1, wherein the heat dissipating layer is formed to a thickness of about 10-100 μm.

10. The method as claimed in claim 1, wherein forming the heat dissipating layer and the nozzle comprises:

forming a lower nozzle by etching the plurality of passivation layers formed on the sacrificial layer;

forming a plating mold for forming an upper nozzle vertically from the inside of the lower nozzle;

forming the heat dissipating layer on the plurality of passivation layers by electroplating; and removing the plating mold to form the nozzle having the upper nozzle and the lower nozzle.

11. The method as claimed in claim 10, wherein the lower nozzle is formed by dry etching the plurality of passivation layers by a reactive ion etching (RIE).

12. The method as claimed in claim 10, wherein the plating mold is formed of a photoresist or photosensitive polymer.

13. The method as claimed in claim 10, wherein forming the heat dissipating layer and the nozzle further comprises forming a seed layer for electroplating the heat dissipating layer on the plurality of passivation layers.

14. The method as claimed in claim 13, wherein the seed layer is formed of at least one metallic layer, and each of the at least one metallic layer is formed by depositing at least one metallic material selected from the group consisting of copper (Cu), chromium (Cr), titanium (Ti), gold (Au), and nickel (Ni).

15. The method as claimed in claim 10, further comprising planarizing an upper surface of the heat dissipating layer by a chemical mechanical polishing (CMP) process, after forming the heat dissipating layer.

16. The method as claimed in claim 1, wherein forming the ink channel comprises dry etching the substrate from a rear surface of the substrate having the manifold.

17. The method as claimed in claim 1, wherein the ink chamber has a substantially rectangular shape.

18. A method of manufacturing a monolithic ink-jet printhead, the method comprising:

forming an ink chamber to be filled with ink to be ejected being on a front surface of a substrate;

forming a manifold for supplying ink to the ink chamber being on a rear surface of the substrate; and forming an ink channel in flow communication between the ink chamber and the manifold, wherein forming the ink chamber includes:

forming sidewalls to a predetermined depth from the front surface of the substrate for defining side surfaces of the ink chamber, forming a bottom wall parallel to the front surface of the substrate at the predetermined depth from the front surface of the substrate for defining a bottom surface of the ink chamber, forming a nozzle plate on the front surface of the substrate, the nozzle plate including a plurality of passivation layers formed of an insulating material, a heat dissipating layer formed of a material having good thermal conductivity, the heat dissipating layer being stacked on the plurality of passivation layers, and a nozzle for ejecting ink out of the monolithic ink-jet printhead in flow communication with the ink chamber, forming a heater between adjacent layers of the plurality of passivation layers of the nozzle plate, the heater being positioned above the ink chamber, forming a conductor between adjacent layers of the plurality of passivation layers of the nozzle plate, and electrically connecting the conductor to the heater.

19. The method as claimed in claim 18, wherein the sidewalls and the bottom wall are formed of a material other than a material of the substrate.

20. The method as claimed in claim 18, further comprising forming a contact hole through the plurality of passivation layers, the heat dissipating layer thermally contacting the front surface of the substrate via the contact hole.

* * * * *